US012757817B2

(12) United States Patent
Dreyer et al.

(10) Patent No.: US 12,757,817 B2
(45) Date of Patent: Oct. 13, 2026

(54) METHOD FOR ELECTRONIC WIND COMPENSATION OF A FERTILIZER SPREADER, CONTROL SYSTEM AND FERTILIZER SPREADER

(71) Applicant: Amazonen-Werke H. Dreyer SE & Co. KG, Hasbergen (DE)

(72) Inventors: Justus Dreyer, Osnabrück (DE); Andre Grosse Brinkhaus, Münster (DE); Arnd Kielhorn, Osnabrück (DE); Markus Ströbel-Fröschle, Georgsmarienhütte (DE); Florian Rahe, Lotte (DE); Per-Christian Heisel, Osnabrück (DE)

(73) Assignee: AMAZONEN-WERKE H. DREYER SE & CO. KG, Hasbergen (DE)

( * ) Notice: Subject to any disclaimer, the term of this patent is extended or adjusted under 35 U.S.C. 154(b) by 337 days.

(21) Appl. No.: 18/576,855

(22) PCT Filed: Jun. 8, 2022

(86) PCT No.: PCT/EP2022/065454
§ 371 (c)(1),
(2) Date: Jun. 3, 2024

(87) PCT Pub. No.: WO2023/280496
PCT Pub. Date: Jan. 12, 2023

(65) Prior Publication Data

US 2024/0284821 A1 Aug. 29, 2024

(30) Foreign Application Priority Data

Jul. 5, 2021 (DE) ..................... 10 2021 117 270.5

(51) Int. Cl.
*A01C 17/00* (2006.01)
*A01C 21/00* (2006.01)

(52) U.S. Cl.
CPC .......... *A01C 17/008* (2013.01); *A01C 21/005* (2013.01)

(58) Field of Classification Search
CPC ............................ A01C 17/008; A01C 21/005
(Continued)

(56) References Cited

U.S. PATENT DOCUMENTS

| | | | | |
|---|---|---|---|---|
| 8,924,030 B2 * | 12/2014 | Wendte | A01B 79/005 700/283 |
| 2014/0303814 A1 * | 10/2014 | Burema | A01C 21/005 701/3 |
| 2020/0045883 A1 * | 2/2020 | De Baere | A01D 41/1243 |

FOREIGN PATENT DOCUMENTS

| | | |
|---|---|---|
| DE | 102016101185 A1 | 7/2017 |
| DE | 102017100668 A1 | 7/2018 |

(Continued)

OTHER PUBLICATIONS

International Search Report for International Application No. PCT/EP2022/065454 dated Sep. 15, 2022 (includes English language translation).

*Primary Examiner* — Steven J Ganey
(74) *Attorney, Agent, or Firm* — Potomac Law Group, PLLC; John (Jack) J. Penny, Jr.

(57) ABSTRACT

A method for electronic wind compensation of a fertilizer spreader, a control system designed for this purpose and a fertilizer spreader equipped therewith are described. Accordingly, the latter discharges fertilizer onto an agricultural area by means of rotating spreading discs, wherein the positions of feed surfaces for the fertilizer on the spreading discs are set in dependence on desired ejection angles which are individually adapted for the spreading discs in a compensatory manner on the basis of a wind prevailing during discharge, in order to counteract a deviation, caused by the wind, of an actual transverse distribution of the fertilizer
(Continued)

from a desired transverse distribution. By virtue of the fact that the rotational speeds of the spreading discs are also adapted in a compensatory manner in order to counteract a deviation, caused by the wind, of an actual casting distance of the fertilizer from its desired casting distance, it is also possible to effectively compensate for undesired wind influence of headwind or trailing wind.

21 Claims, 14 Drawing Sheets

(58) Field of Classification Search
USPC .............................. 239/7, 69, 667, 673, 681
See application file for complete search history.

(56) References Cited

FOREIGN PATENT DOCUMENTS

| | | | |
|---|---|---|---|
| DE | 102017109308 | A1 | 11/2018 |
| EP | 2556738 | A1 | 2/2013 |
| EP | 3216335 | A1 | 9/2017 |

* cited by examiner

METHOD FOR ELECTRONIC WIND COMPENSATION OF A FERTILIZER SPREADER, CONTROL SYSTEM AND FERTILIZER SPREADER

CROSS REFERENCE TO RELATED APPLICATIONS

The present application claims priority under 35 U.S.C. § 365 to PCT/EP2022/065454 filed on Jun. 8, 2022 and under 35 U.S.C. § 119(a) to German Application No. 10 2021 117 270.5 filed on Jul. 5, 2021.

BACKGROUND

The disclosure relates to a method for electronic wind compensation of a fertilizer spreader, a control system adapted thereto and a fertilizer spreader equipped therewith.

From the generic DE 10 2016 101 185 A1, it is known to correct the spread fan (the spread pattern) of a fertilizer spreader by compensatorily adapting set values, with which actuators of the fertilizer spreader are controlled/regulated for generating a predetermined spread fan, depending on a measured wind force and wind direction. This occurs with crosswinds such that the lateral expansion of the spread fan increases on a side of the fertilizer spreader facing the crosswind and decreases on a side of the fertilizer spreader facing away from the crosswind. The above-mentioned enlargement can be selectively suppressed during boundary spreading at a field boundary on the side of the fertilizer spreader facing the field boundary.

In order to correct the spread fan, at least one of the following actuators can be controlled. The drive elements of the centrifugal discs can be used to set the casting distance of the fertilizer by means of their rotational speed. The faster the disc rotates, the greater the casting distance. Furthermore, the feed point (the feed surface) of the fertilizer on the respective centrifugal disc can be rotated or otherwise positioned from a feed system arranged above it in order to set the ejection angle and thus turn the spread fan outwards or inwards. It is also possible to control the dosing elements of the feed system in order to adapt the quantity of fertilizer discharged per time unit and, consequently, the distribution and output quantity of fertilizer per unit area.

Furthermore, it is known from DE 10 2016 101 185 A1 to adapt at least one of the set values listed below or a value proportional thereto to correct the spread fan as a function of the measured wind force and wind direction for the respective centrifugal disc: Rotational speeds, dosing quantities of fertilizer per time unit, ejection angle of the fertilizer, positions of the feed points of the fertilizer feed systems, angular positions of the casting vanes arranged on the centrifugal discs.

The selective spreading of partial widths of a spread fan is moreover known from DE 10 2017 100 668 A1.

The disadvantage to date, however, was that only crosswinds were taken into account, namely in the form of the measured wind force and wind direction. This actually allows the working width resulting from crosswinds to be adapted to a desired working width specified for the spreading process, for example by changing the desired ejection angle individually in a compensatory manner, for which purpose the respective feed point and, if necessary, the respective rotational speed are adapted accordingly.

However, even with a headwind or tailwind, the casting distance of the fertilizer can change so much that, for example, the calculated switching points of the partial widths lead to an uneven and/or misdirected discharge of the fertilizer.

It has also been found that the wind conditions in the area of the spread fan can deviate so much from those on the anemometer that the fertilizer discharge is too inaccurate for this reason as well.

SUMMARY

There is therefore a need for improved methods and devices for the wind-corrected discharge of fertilizer on agricultural area.

The method of the disclosure serves for electronic wind compensation/control of a fertilizer spreader. In a generic manner, this fertilizer spreader discharges fertilizer onto an agricultural area by means of rotating spreading discs, wherein the positions of feed surfaces for the fertilizer on the spreading discs are set as a function of desired ejection angles, which are compensatorily adapted for the spreading discs individually on the basis of a wind prevailing during discharge, in order to counteract a deviation of an actual transverse distribution of the fertilizer from a desired transverse distribution caused by the wind.

Furthermore, according to the disclosure, the rotational speeds of the spreading discs are compensatorily adapted in order to counteract a deviation of an actual casting distance of the fertilizer from its desired casting distance caused by the wind.

However, unless expressly stated otherwise, preferred further developments are also possible based on the generic method, wherein any technically reasonable combination of the embodiments described below is conceivable.

Due to the influence of wind, the spread fans of the fertilizer generated by the spreading discs, which generally correspond to an approximately kidney-shaped area distribution without wind influence, can be considerably distorted. The control system described counteracts this by specifying at least one compensatory set value. The specification of set values for the ejection angle from the respective spreading disc, to which a set value for the position of the feed surface and a set value for the rotational speed are usually assigned as setting parameters, has proven effective for this purpose.

On the basis of the measured wind direction and wind force, these and, if necessary, other setting parameters of the fertilizer spreader, for example the rotational speed of the respective spreading disc, are selectively changed such that the distortion is counteracted or that it is compensated for by subsequent fertilizations during further passes, for example a return pass in the opposite direction. The latter can be the case, for example, if the wind conditions do not allow sufficient equalization of the spread fans.

The desired ejection angles are defined, for example, by straight lines that run from the axes of rotation of the spreading discs to the respective center of gravity of the spread fans (flat spread patterns) of the fertilizer. The same applies to casting distances that are defined, for example, between the spreading disc and the center of distribution. The center of distribution is typically defined as the intersection of the 50% percentiles of the spread fans with regard to radial distribution and circumferential distribution.

The fertilizer is a mineral fertilizer, for example. In principle, however, any granular grit could be used.

Preferably, the wind direction and wind force of the wind are vectorially decomposed into a travel direction component parallel to the travel direction and a side component orthogonal to the travel direction in order to adapt the desired ejection angle and/or to reduce the deviation of the actual casting distance.

The side component primarily affects the transverse distribution of the fertilizer and the working width, while the travel direction component primarily affects the casting distance. In principle, both disruptive effects can be compensated for via the positions of the feed surfaces of the fertilizer on the spreading discs and their rotational speed. The compensatory adaption of these setting parameters can be weighted more precisely by the component decomposition and the correction of spread fans can thus be optimized. In the process, the assigned dosing quantities of fertilizer for the spreading discs can be adapted accordingly.

Alternatively, from the wind direction and the wind speed of the wind, a displacement of the spread fan generated with the spreading discs under the influence of wind can be determined compared to a spread fan generated without the influence of wind, wherein at least one side component of the displacement orthogonal to the direction of travel is then calculated to reduce the deviation of the actual casting distance and/or an adaption of the desired ejection angle is calculated on the basis of the displacement as a whole.

Preferably, the deviation of the actual casting distance is compensatorily reduced on the basis of the side component of the wind direction/wind force or the displacement and, in particular, with their respective predominant weighting compared to an associated travel direction component.

Preferably, the desired ejection angles are compensatorily adapted on the basis of the actual ejection angles assigned to the displacement and, in particular, taking into account the compensation of the actual casting distance.

Actual casting distances and/or actual ejection angles can be calculated and/or measured in a manner known in principle.

Preferably, spread fans and/or transverse distributions generated by the spreading discs are corrected and, in particular, equalized by compensatory reduction of the deviation of the actual casting distance from its standard value for calm conditions.

Preferably, spread fans and/or transverse distributions of the fertilizer generated with the spreading discs are equalized by compensatory changes to the desired ejection angles compared to their standard values for calm conditions. This is done, for example, by calculating current compensatory values for the desired ejection angles and/or selecting them from a list of previously calculated compensatory values.

Preferably, a wind-changing influence of at least one topographical feature present on the agricultural area is quantified by measurement and/or calculation and is then included in a calculation of the wind prevailing in the area of a spread fan generated by the spreading discs to compensate for it. The calculation is then carried out in particular on the basis of a wind measured in the area of the agricultural area during discharge.

Topographical features can be, for example, the topography of the agricultural area, plants such as trees or shrubs and/or buildings.

Preferably, wind coefficients are assigned to the topographical feature and/or a partial area of the agricultural area assigned to it, which quantify the wind-changing influence of the topographical feature as a function of different wind directions.

Preferably, wind force and wind speed are measured during discharge in the area of the fertilizer spreader and stored with associated geographical measurement positions. Furthermore, the geographical position of at least one topographical feature of the agricultural area as well as a prevailing main wind direction and main wind force are then assigned to these measured values in order to quantify a wind-changing influence of the topographical feature in a location-specific manner.

For example, measured values of the wind directions and wind forces with associated topographical measurement positions can be stored, in particular taking into account a main wind direction and main wind force predicted and/or measured for the time of the respective wind measurement and the agricultural area, and local deviations of the wind directions and wind forces from main wind directions and main wind forces caused by the topographical features can be calculated from this.

For example, the wind direction and wind force as well as associated geographical measurement positions can be measured by means of at least one drone flying over the agricultural area and, in particular, flying ahead and/or upwind of the fertilizer spreader.

Preferably, wind directions and wind speeds measured at different heights, in particular by means of a wind sensor travelling with the fertilizer spreader and a drone flying over the agricultural area, are mechanically compared with each other in order to qualitatively estimate the wind prevailing in the area of the fertilizer spreader with regard to the prevalence of uniform, turbulent or gusty wind conditions.

Preferably, wind directions and wind speeds measured by a wind sensor travelling with the fertilizer spreader and/or at least one drone flying over the agricultural area are stored in the form of a wind map and, in particular, superimposed on a topographical map of the agricultural area.

Preferably, the wind map is mechanically compared with an application map containing location-specific desired spread rates and applied actual spread rates of the fertilizer, with a precipitation map containing historical and/or predicted local precipitation amounts, with a solar radiation map containing historical and/or predicted local sunshine hours and/or with a setting map containing location-specific setting parameters of the fertilizer spreader in order to plan the future discharge operations for spreading the fertilizer on the agricultural area on the basis of historical data of comparable discharge operations.

As a result, deviations from the measured wind direction and wind force to be expected in the area of the spread fans can be estimated even more precisely, for example to determine possible influences of thermals in order to calculate a topographically corrected wind direction and wind force and use these to determine the desired ejection angles and rotational speeds of the spreading discs.

Wind sensors generally only allow wind measurements at certain points. For example, ultrasonic measurement with a cross-shaped measurement arrangement, measurement using Doppler lidar, determination using satellite data and/or measurement using drones are known. In previous systems, it is assumed that the measured wind directions and wind speeds are also available over the entire area of the spread fan and/or can be calculated by interpolation/extrapolation when using several sensors. However, the wind conditions, especially in the rear part of the spread fan, can also differ considerably from the wind conditions in the area of wind sensors due to topographical influences, in particular wind obstacles such as hills, buildings and trees.

By determining the wind and position and assigning geographical positions of wind-changing topographical features, for example using a topographical map, it is possible to conclude the flow conditions in the entire area of the respective spread fan (preferably including all trajectories of the fertilizer) from wind measured at specific points. For this purpose, flow simulations and/or location-dependent and possibly wind direction-dependent wind coefficients can be used to characterize local wind attenuation or amplification.

By repeatedly driving through the relevant flow fields, wind data is collected which can be used to validate and optimize the simulations and/or the wind coefficients determined.

The simulations and/or the determined wind coefficients can be used to calculate and store the distribution quality of the fertilizer during spreading. By taking into account the topography and possibly other environmental information and/or wind coefficients derived from it, this is possible more precisely than on the sole basis of conventional wind measurement. Before or during a spreading operation, a warning can be given of poor spreading quality.

Additionally or alternatively, when approaching relevant topographical features or associated wind changes, setting values of the fertilizer spreader can be adapted, for example by changing the rotational speed of the respective spreading disc for predictive adaption of the casting distance.

In addition, tramline planning for future spreading operations is possible/adaptable on the basis of such information. For example, no fixed tramline system needs to be observed in grassland, so that spreading operations with adapted tramline systems are conceivable there. It is also possible to provide an adapted tramline system for a future sowing process based on this information.

When driving out of areas with special wind conditions such as relevant slipstreams, for example, the setting values of the fertilizer spreader would not have to be changed as soon as the wind sensor indicates changes, but only when larger parts of the spread fan are no longer subject to the special wind conditions.

The following parameters, for example, could be taken into account for the wind-related adaption of setting values: Relative position of sensor to spread fan or partial width; direction of movement and speed; relative positions to topographical feature; last known or measured wind direction and wind speed; flight characteristics of the fertilizer. A vectorial component decomposition of the wind direction is preferred.

Wind data can be stored in the form of a wind map for later evaluation, wherein the map preferably also shows the topography in order to be able to analyze its relationship with the local wind conditions. Local thermals can also be taken into account in a preferred manner. For this purpose, temperatures, solar radiation and the surface of the ground can be analyzed and evaluated.

Preferably, the spreading discs and associated feed systems are controlled with different inertia and/or amplitude during boundary spreading depending on the wind direction with respect to the boundary being driven off, in particular relatively fast/with greater amplitude when the wind is blowing from the fertilizer spreader towards the boundary and relatively slow/with smaller amplitude when the wind is blowing from the boundary towards the fertilizer spreader. This reliably prevents the fertilizer from being thrown beyond the boundary. In contrast, a deterioration of the spread fan on the inside of the field can be accepted.

Preferably, during boundary spreading, the setting values of the spreading discs, casting vanes attached to them and/or an associated boundary spreading deflector and, in addition, a desired distance of the spread fan to the driven boundary are automatically adapted depending on the wind direction and wind speed. Depending on the force and/or variability of the wind, the risk of unwanted casting beyond the field boundary can thus be reduced.

Preferably, on the basis of calculated and/or measured actual ejection angles and actual casting distances, spread fans and/or transverse distributions of the mineral fertilizer are calculated for the wind direction and wind force used as a basis, particularly in the area of the spread fans, and the associated compensatory change is displayed, particularly in the form of polygons. This enables a clear and quick visualization of the compensatory control.

Preferably, over-fertilization and under-fertilization are visualized by color scaling of affected partial areas and/or partial widths in a map of the agricultural area. Preferably, areas before the spreading process, after the first pass and after the subsequent pass are displayed with different color scaling. For example, an actual discharged quantity is displayed, which should generally correspond to the intended desired quantity after a second pass at the latest. This can be taken into account, for example, during a subsequent pass or a future spreading process. In principle, predicted quantities could also be displayed in the corresponding way.

Preferably, deviations of wind-related actual positions of partial widths TB from their desired positions are measured, calculated and/or displayed and/or the actual positions are compensated. This allows users to estimate positions, expansions and quantity distributions and/or switching points of spread fans in a clear form. The deviations of wind-related actual positions of partial widths TB from their target positions can be taken into account in a compensatory adaption.

Preferably, a database and/or at least one function for characterizing a plurality of different discharge situations and/or wind conditions and/or spread patterns is provided. Furthermore, actual ejection angles and actual casting distances are then calculated on the basis of the respective desired spread pattern and the wind measured/estimated, for example, on the basis of wind maps and/or drone overflights.

The adaption of the desired ejection angle could also be deactivated and replaced by the application of a fixed ejection angle if an actual working width resulting from maximum wind compensation deviates too much from the desired working width, i.e. by more than a fixed or definable amount. This allows the user to limit the wind compensation to certain control areas in a comprehensible manner.

The problem posed is also solved with a control system for a fertilizer spreader with a computing unit and at least one program stored therein for compensatory control of the spreading discs of the fertilizer spreader together with associated feed systems according to the methods of the disclosure.

The control system also comprises the components described with regard to the corresponding functions/method steps, such as at least one database, a data bus and/or a radio interface, which can, for example, enable communication with at least one drone for accompanying wind measurement. For example, a wind sensor travelling on the fertilizer spreader and/or on an associated tractor can be connected to the data bus.

The control system is then preferably part of a fertilizer spreader for spreading fertilizer using two spreading discs.

BRIEF DESCRIPTION OF THE DRAWINGS

Preferred embodiments of the disclosure are shown in drawings. It is shown by.

DETAILED DESCRIPTION

Figure 1A:
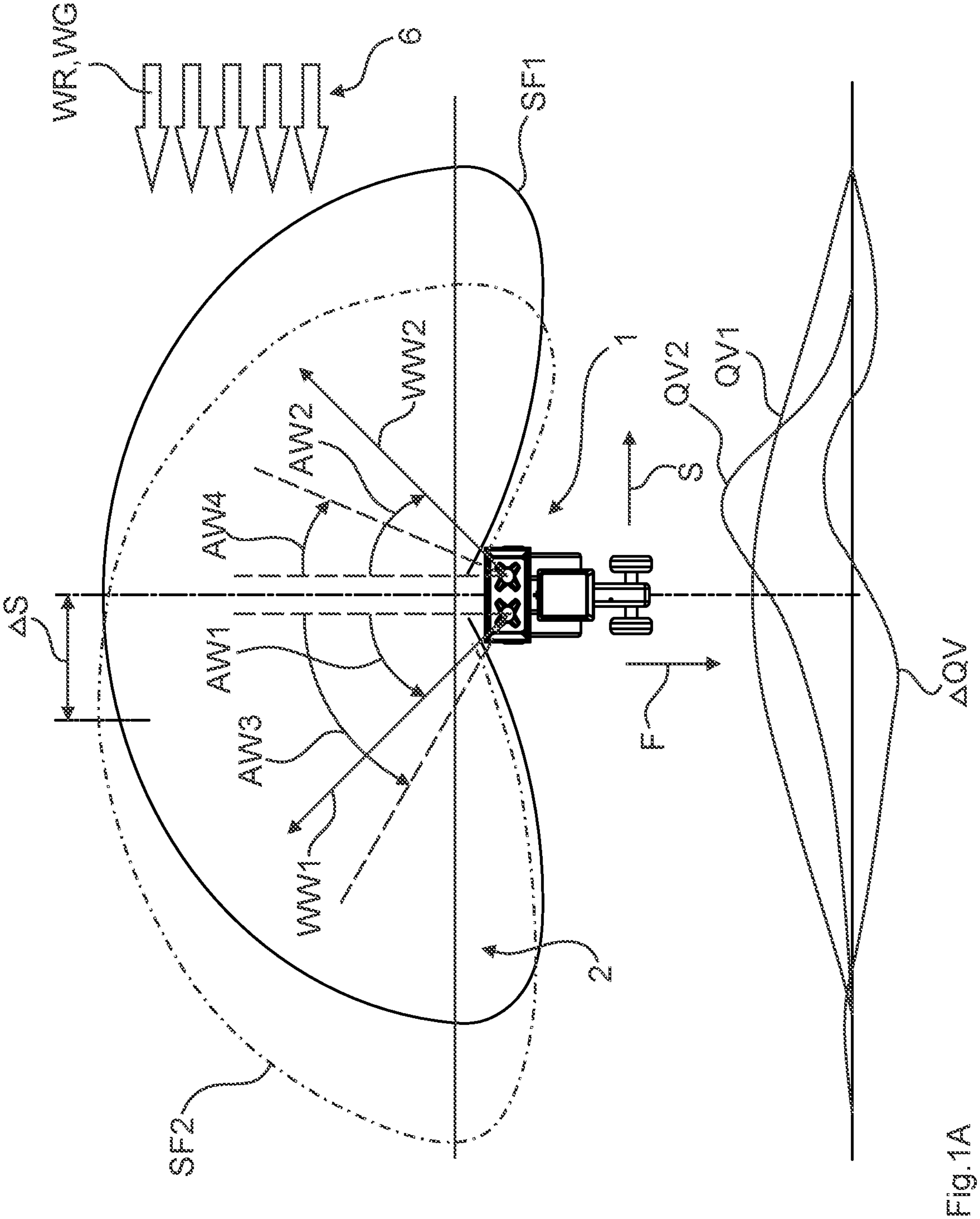
FIGS. 1A-1C are schematic representations of a spread fan in calm and different wind conditions.
Figure 1B:
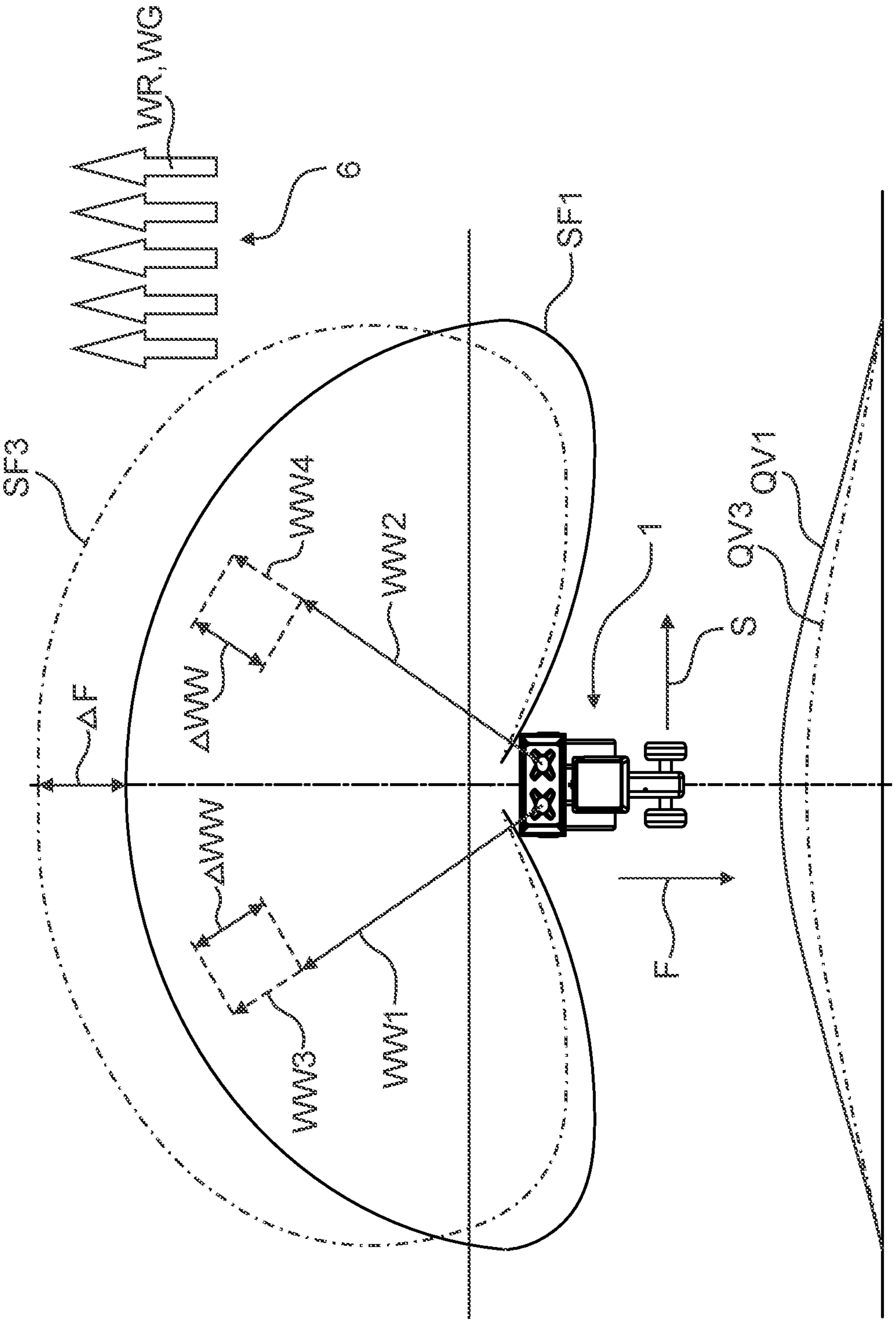
Figure 1C:
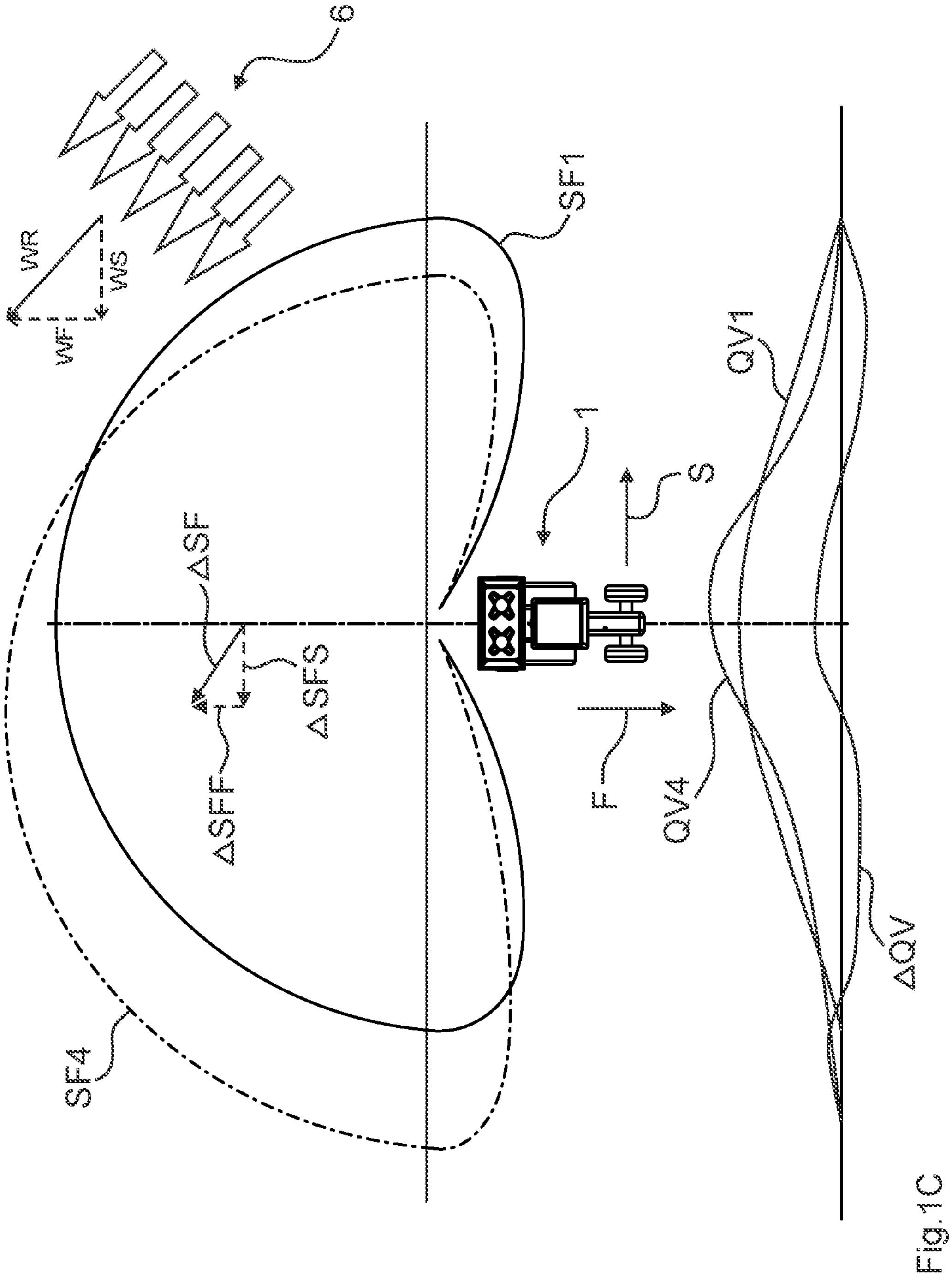
Figure 7:
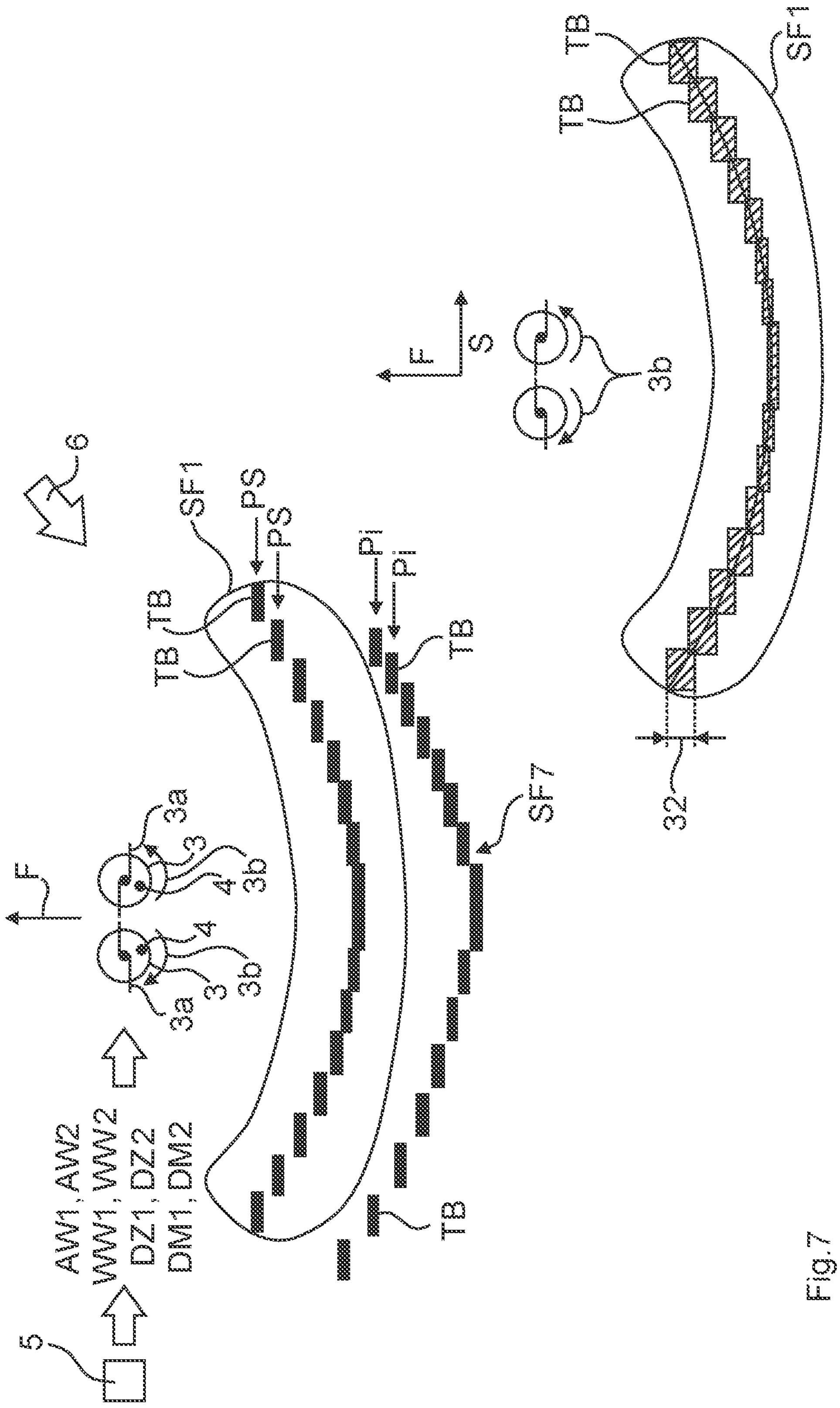
FIG. 7 is a schematic representation of a situation with part-width section switching.

FIGS. 1A to 1C exemplarily and schematically show a fertilizer spreader 1 discharging mineral fertilizer 2 under idealized conditions in calm and different characteristic wind conditions. Details of the fertilizer spreader 1 that are known in principle are also shown in FIG. 7, namely two spreading discs 3 with casting vanes 3*a*, which rotate in the direction of rotation 3*b*. In addition, the feed surfaces 4, also called feed points, of feed systems for the fertilizer 2 onto the spreading discs 3 (the function of which is known in principle and therefore not shown) are indicated.

The fertilizer spreader 1 comprises an electronic control system 5 with which the positions of the feed surfaces 4 are set by specifying individual desired ejection angles AW1, AW2 for the spreading discs 3, for example by pivoting in/against the respective direction of rotation 3*b* of the spreading discs 3 and/or by shifting in a radial direction.

The individual rotational speeds DZ1, DZ2 of the spreading discs 3 can also be set with the control system 5 by specifying individual desired casting distances WW1, WW2. The dosing quantities DM1, DM2 of fertilizer 2 delivered to the spreading discs 3 by the feed systems can also be set individually. These basic functions are known and are therefore not described in detail.

As FIGS. 1A to 1C each indicate, the spreading discs 3 generate a first spread fan SF1 of the fertilizer 2 that is essentially symmetrical with respect to the direction of travel F with identical setting of the spreading discs 3 and in calm conditions. This is preferably generated by specifying desired ejection angles AW1, AW2 and desired casting distances WW1, WW2, which are defined, for example, in relation to a center of gravity of the fertilizer distribution.

The first spread fan SF1 represents a desired spread pattern for the fertilizer 2. The moving fertilizer spreader 1 thus ideally generates a first transverse distribution QV1 of the fertilizer 2 that is axially symmetrical with respect to the direction of travel F in the sense of a desired transverse distribution to be maintained/produced. This is generated to match a desired working width AB1 (see FIGS. 5A and 5B), so that adjacent first transverse distributions QV1, which are generated inside the field along equidistant tramlines, add up to form a curve that is as horizontal as possible, which is known in principle. A curve that is as horizontal as possible corresponds to a uniform (homogeneous) spreading material discharge per unit area. Alternatively, a curve that corresponds to an inhomogeneous desired distribution may also be desired, for example because different areas require a different desired quantity due to additional conditions.

FIG. 1A exemplarily shows the disturbing influence of wind 6, which blows with a wind direction WR orthogonally to the direction of travel F. The wind direction WR is symbolized by the orientation of block arrows and the wind speed WG (wind force) by their size. This form of representation is also maintained elsewhere.

The exclusively laterally incoming wind 6 leads to a second spread fan SF2 distorted in the lateral direction S (transverse direction) and a correspondingly distorted second transverse distribution QV2 in the sense of an actual transverse distribution to be compensated. The resulting deviation ΔQV of the second transverse distribution QV2 from the first transverse distribution QV1 is exemplarily shown as a difference curve. This is accompanied by a lateral displacement ΔS of the second spread fan SF2 compared to the first spread fan SF1.

The control system 5 of the fertilizer spreader 1 comprises at least one electronic computing unit 5*a* (exemplarily shown in FIG. 3) with a correction program in order to counteract the deviation ΔQV of the second transverse distribution QV2 from the first transverse distribution QV1 or the lateral displacement ΔS otherwise caused by the wind 6 and, in particular, to minimize these deviations. In other words, this equalizes the second spread fan SF2 and aligns it as closely as possible with the first spread fan SF1.

For such a correction of the second spread fan SF2 or the second transverse distribution QV2, the desired ejection angles AW1, AW2 and/or casting distances WW1, WW2 are changed compensatorily with respect to their standard values for calm conditions, for example by an actual calculation of compensatory values for the desired ejection angles AW1, AW2 and/or casting distances WW1, WW2 and/or their selection from a list of previously calculated compensatory values.

The computing unit 5*a* of the control system 5 comprises, for example, a correction program to counteract a deviation ΔWW of the actual casting distances WW3, WW4 from the desired casting distances WW1, WW2 induced by the wind 6 and to minimize the deviation ΔWW in particular.

In principle, such adaptions are possible in a simultaneous/overlapping manner. For example, the rotational speed and ejection angle are corrected, wherein the rotational speed can only be adapted with a systematic inertia. The control can include matching filter functions, for example in the form of a dead band, as a result of which uninterrupted and excessively nervous control of the spreader can be avoided.

In parallel, the basic rotational speed can also be adapted, thus changing the basic characteristics of the spread pattern. In particular, the basic rotational speed can be reduced, for example from 900 to 800 rpm, in order to then have a control range of 200 rpm up to an exemplarily assumed maximum rotational speed of 1000 rpm available for wind compensation. If the margin (depending on the wind) is repeatedly insufficient to control against the wind, the basic spread pattern can be "converted" to 800 rpm and then operated at this basic rotational speed.

Suitable correlations between different wind directions and speeds WR, WG and suitably counteracting or compensating desired ejection angles AW1, AW2 and desired casting distances WW1, WW2 can, for example, be determined in advance by spreading tests and/or based on measurements taken during previous spreading processes and/or determined by simulating the influence of the wind and modeling the spreading behavior. In principle, this also applies to correlations with disc rotational speeds and/or casting distance adaptions.

The control system 5 can merely display the respective counteracting/compensating values in the sense of a suggested setting or also apply them automatically. This can depend on the extent of the compensation required and/or the respective application situation, as exemplarily (but not restrictively) described below with regard to boundary spreading.

In line with the compensatory changes to the desired ejection angles AW1, AW2, the control system 5 first sets the rotational speeds DZ1, DZ2 and then, for additional correction, the positions of the feed surfaces 4 and, if necessary, the positions of the casting vanes 3*a*.

Furthermore, FIG. 1A shows the actual ejection angles AW3, AW4 of the uncompensated second spread fan SF2, which, however, are not set with the described wind compensation, but are aligned as closely as possible to the desired ejection angles AW1, AW2 for ideal conditions.

Based on FIG. 1A, FIG. 1B illustrates the disruptive influence of wind 6, which blows with a wind direction WR parallel to the direction of travel F.

In this case, the wind 6 leads to a third spread fan SF3 that is extended to the rear against the direction of travel F by a spread ΔF, which is comparatively slightly compressed in the lateral direction S. The distribution centers of the third spread fan SF3 are shifted parallel to the direction of travel F, which results in a deviation ΔWW of actual casting distances WW3, WW4 of the fertilizer 2 (starting from the respective spreading disc 3) compared to desired casting distances WW1, WW2, which for the sake of simplicity are indicated on the first spread fan SF1 for calm conditions.

Due to the increased casting distances WW3, WW4 in the example, the fertilizer 2 is distributed over a larger area, so that the resulting third transverse distribution QV3 is flatter overall than the first transverse distribution QV1.

The computing unit 5*a* of the control system 5 also comprises a correction program to take account of such a deviation ΔWW of the actual casting distances WW3, WW4 from the desired casting distances WW1, WW2 induced by the wind 6 at the switch-on and switch-off points (when exiting and entering the headland). If the wind is blowing from the front, the position of the switch-off point is moved further away from the inside of the field. The switch-on point is shifted further into the field, corresponding to the calculated shift in the direction of travel due to the wind.

The control system 5 can merely display/suggest the corrected switching points or also apply them automatically. This can depend on the extent of the necessary compensation and/or the respective application situation, as exemplarily (but not restrictively) described with regard to a part-width section control.

In line with the compensatory changes to the desired casting distances WW1, WW2, the control system 5 then sets, for example, the rotational speeds DZ1, DZ2 of the spreading discs 3 and the positions of the feed surfaces 4 and/or the positions of the casting vanes 3*a*. For example, the rotational speed/casting distance is used as a basis and the casting direction is determined. However, both values are usually calculated in real time and therefore in parallel. The preference for the casting distance as the starting point is based on a fundamental interpretation of spread patterns, in which the casting distance is usually regarded as "semi-constant".

For wind 6 blowing in the opposite direction, i.e. tailwind, the procedure described above applies analogously, in principle only with the opposite sign regarding the shifting of switch-on and switch-off times.

FIG. 1C exemplarily shows the disturbing influence of an obliquely incoming wind 6 from any direction, which consequently consists of a side component WS orthogonal to the direction of travel F and a travel direction component WF parallel to the direction of travel F.

The wind 6 then causes a fourth spread fan SF4 distorted in the lateral direction S, which is also noticeably shifted/spread against the direction of travel F. The fourth spread fan SF4 leads to a correspondingly distorted fourth transverse distribution QV4 in the sense of an actual transverse distribution to be compensated. A deviation ΔQV of the second transverse distribution QV4 from the first transverse distribution QV1 (desired transverse distribution) caused by this is again exemplarily illustrated as a difference curve.

The displacement of the fourth spread fan SF4 also means a deviation ΔWW of the real actual casting distances WW3, WW4 of the fertilizer 2 compared to its desired casting distances WW1, WW2 (similar to FIG. 1B, therefore not shown again).

Preferably, a displacement ΔSF of the fourth spread fan SF4 generated with the spreading discs 3 under the influence of wind is determined compared to the spread fan SF1 generated without the influence of wind. For this purpose, for example, the displacement ΔSF of the respective distribution centers (here the spread fans SF1 to SF4) resulting from the wind direction WR and the wind speed WG of the wind 6 can be calculated. The displacement ΔSF is then broken down into a side component ΔSFS orthogonal to the direction of travel F and a travel direction component ΔSFF parallel to the direction of travel F.

It is then particularly practicable to compensatorily reduce the deviation of the actual casting distance ΔWW and/or the spreading pattern displacement ΔSF on the basis of its side component ΔSFS, for example without or with a slightly weighted consideration of the associated travel direction component ΔSFF.

The compensatory adaption of the desired ejection angles AW1, AW2, on the other hand, is preferably calculated on the basis of the total displacement ΔSF.

For such a reduction/minimization of the deviations ΔQV and/or ΔWW and/or ΔSF, the wind influence 6 to be compensated for can be additionally or alternatively vectorially broken down by the control system 5 into a side component WS (corresponding to an orthogonal crosswind) of the wind 6 orthogonal to the direction of travel F and a travel direction component WF (corresponding to a parallel headwind or tailwind) of the wind 6 parallel to the direction of travel F.

The vectorial decomposition is shown schematically and exemplarily in FIG. 1C both for the spreading pattern displacement ΔSF and for the wind direction WR. Accordingly, the wind direction WR of the wind 6 results in the respective size ratio of the side component WS and the travel direction component WF to each other. The wind speed WG (wind force) of wind 6 naturally has an equal effect on the absolute values of the side component WS and the travel direction component WF. The components ΔSFS, ΔSFF of the spreading pattern displacement ΔSF result directly from their vectorial decomposition.

The compensatory adaption of the desired ejection angles AW1, AW2 and the desired casting distances WW1, WW2 is then preferably carried out with predominant weighting or completely on the basis of the side component ΔSFS (WS if applicable). Compensatory adaptions in/against the direction of travel, on the other hand, are preferably made by adapting switching time points (on/off).

In principle, a modular correction program can be provided in the control system 5, which can be adapted relatively easily and flexibly to different application situations inside the field, at the edge of the field, in part-width section control, in the area of headlands or the like, in particular on the basis of the vectorial displacement decomposition and/or wind decomposition into the side component ΔSFS, WS orthogonal to the direction of travel F and the travel direction component ΔSFF, WF parallel to the direction of travel F.

The premise here is preferably that a spreading pattern correction (compensation of the lateral spreading pattern displacement) is carried out exclusively or primarily in the lateral direction and a switching point correction (compensation of the spreading pattern displacement in/against the direction of travel) is carried out exclusively or primarily in the direction of travel.

Figure 2A:
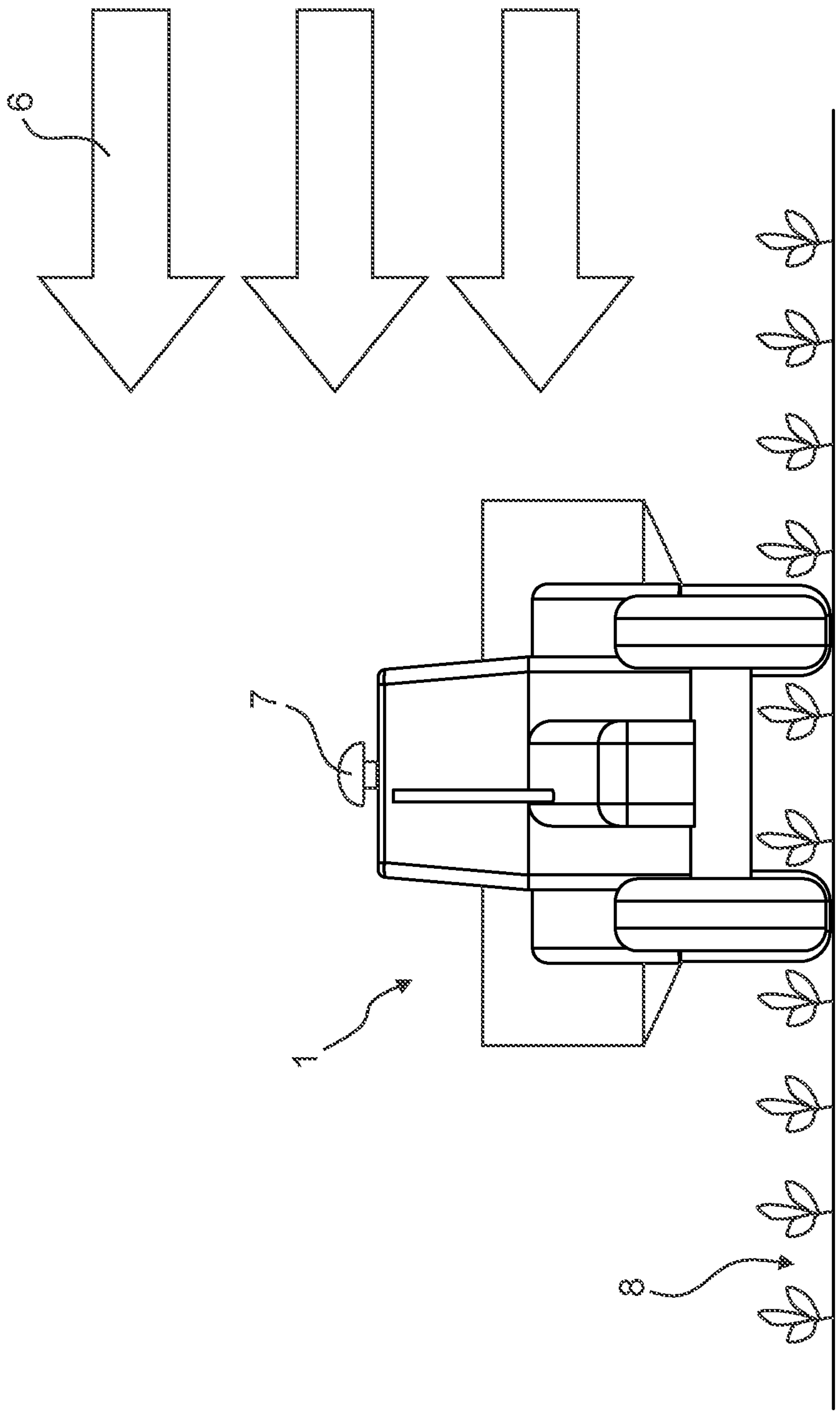
FIGS. 2A to 2E are schematic representations of various flow situations with crosswinds.

FIG. 2A schematically indicates that the randomly incoming wind 6 can be continuously monitored in a manner known in principle in the area of the fertilizer spreader 1, thus by a wind sensor 7 arranged on the fertilizer spreader 1 or an associated tractor, which measures the respective wind direction WR and wind speed WG.

When considering wind conditions when discharging fertilizer 2, it has so far been assumed for simplification purposes that the wind 6 is spatially largely uniform and essentially laminar flowing over the agricultural area 8 to be cultivated. This is indicated schematically in FIG. 2A by identically aligned and dimensioned block arrows to represent the wind 6.

For the sake of simplicity, it is also assumed that the wind direction WR and wind speed WG measured with the wind sensor 7 are identical to those in the (entire) area of the intended spread fan SF1. Accordingly, the measured wind direction WR and wind speed WG are used directly in calculations for wind compensation, if necessary after suitable processing of the measured values such as averaging and/or filtering.

The described vectorial decomposition of the spreading pattern displacement ΔSF and/or the wind direction WR into the side component WS and the travel direction component WF is possible on this basis and is also preferred in principle. In addition or alternatively, however, improved wind compensation is also possible by taking into account the influence of wind due to topographical features 9 in the area of the agricultural area 8, as exemplarily described below.

Figure 2B:
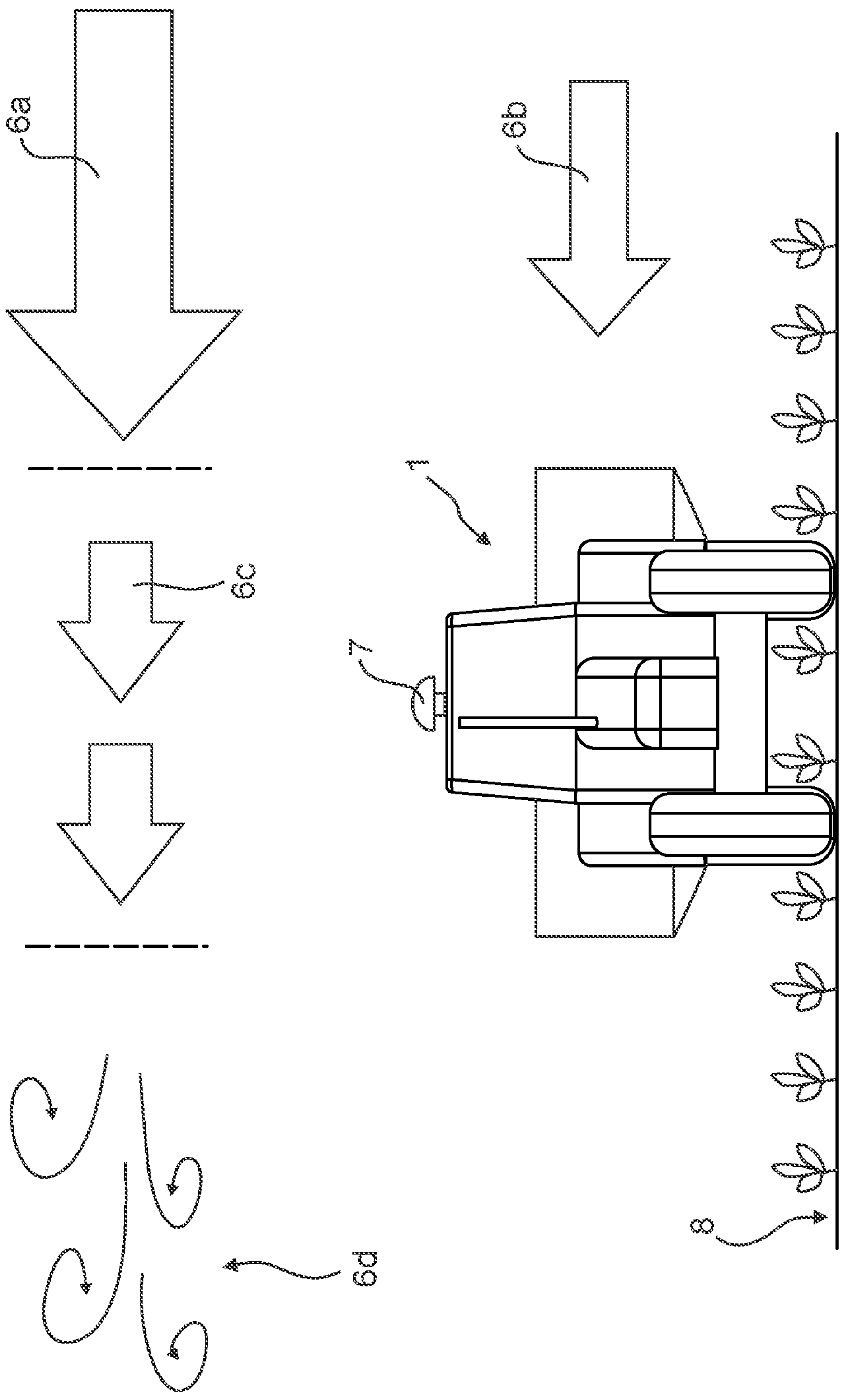

Accordingly, FIG. 2B schematically illustrates that the wind conditions to be taken into account can be subject to strong fluctuations both qualitatively and quantitatively. For example, a uniformly strong wind 6*a*, a uniformly weak wind 6*b*, a gusty wind 6*c* and a swirling wind 6*d* are shown, for which, for example, a locally fluctuating wind direction WR can be assumed.

While temporal fluctuations between such wind conditions could in principle be recorded with the wind sensor 7 and taken into account in calculations, their spatial fluctuations over the agricultural area 8 have so far generally not been taken into account.

Figure 2C:
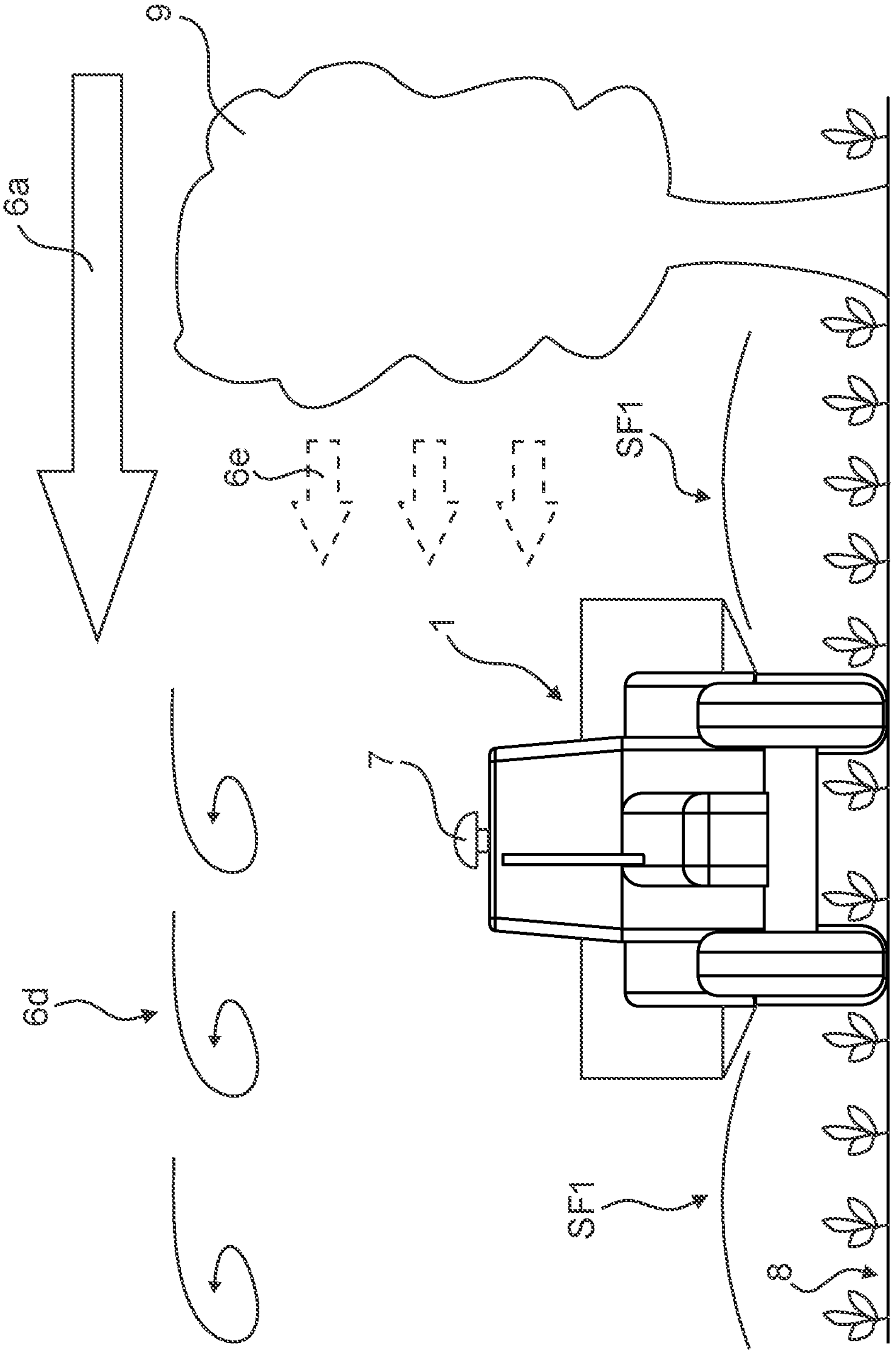
Figure 2D:
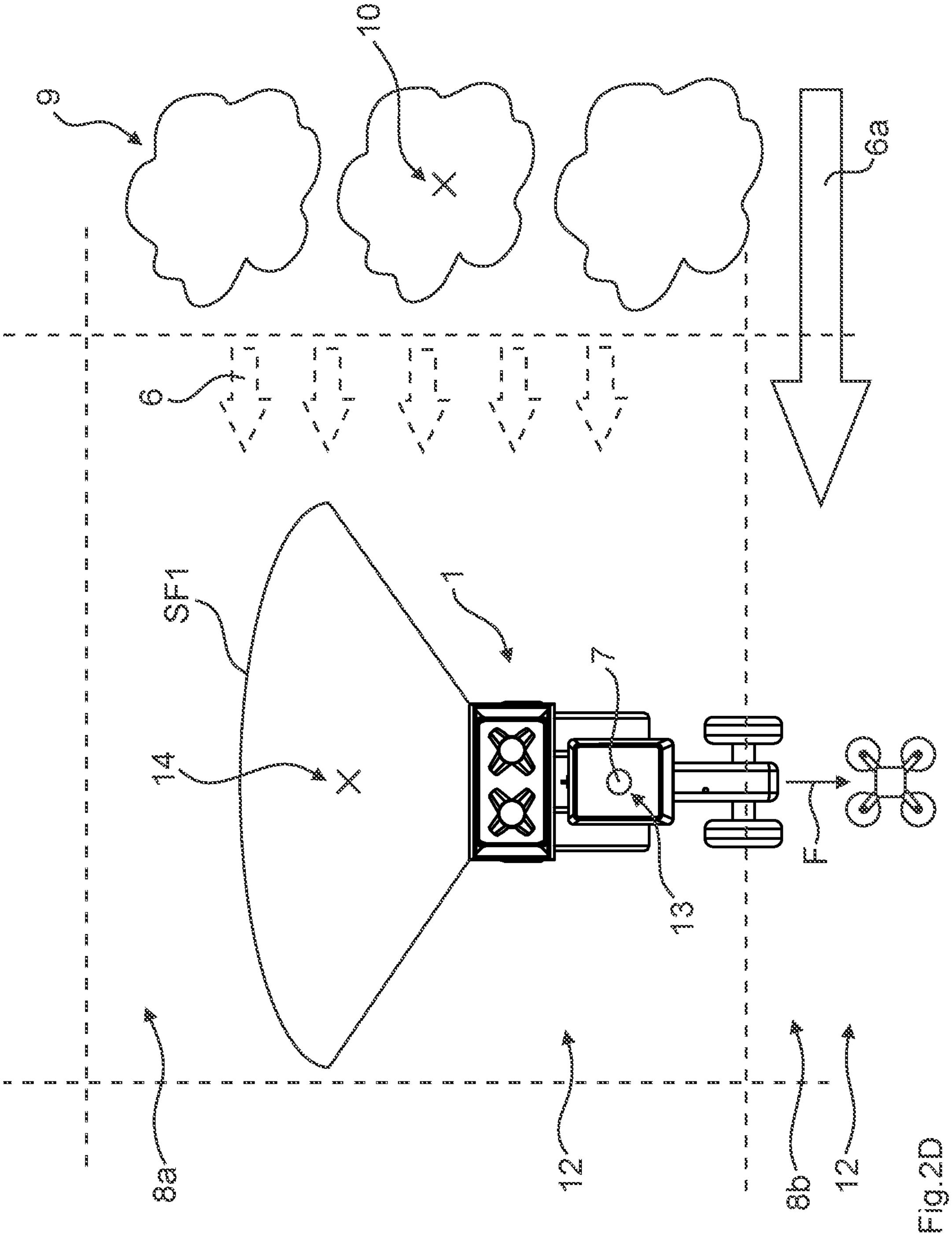

As FIGS. 2C and 2D indicate in this respect, topographical features 9 in the area of the agricultural area 8 to be worked can significantly influence the local wind conditions over the intended spread fan SF1 and also change them compared to the wind conditions detected by the wind sensor 7.

As an example, a topographical feature 9 is shown in the form of a row of trees over which a uniformly strong wind 6*a* is blowing. Behind the treetops, for example, there is an upper area with turbulent flowing, thus swirling wind 6*d* and a lower area with a slipstream 6*e* (indicated by dashed block arrows), which is decisive for the spread fan SF1 in the situation shown and therefore temporarily represents the wind 6 to be compensated. Similar wind conditions could arise next to buildings, for example.

Topographical features 9 primarily form wind obstacles and therefore usually have a flow-reducing influence on the area of the spread fan SF1, possibly also compared to the wind conditions detected by the wind sensor 7.

The current flow influence of individual topographical features 9 can be estimated on the basis of preceding travels and wind measurements with the fertilizer spreader 1 or during the current travel by monitoring and evaluating the wind conditions when approaching a particular topographical feature 9, when reaching and/or leaving the same in the individual tramlines. This can then be used to draw conclusions about the wind conditions to be expected in the area of topographical feature 9 on the next approach (in another tramline). In this way, the wind compensation described can be carried out in advance to suit the topography.

Individual partial areas 8*a*, 8*b* of the agricultural area 8 and/or geographical positions 10 of topographical features 9 can, for example, be assigned wind coefficients 12, which indicate the flow-changing influence of the topographical features 9 as a function of the wind direction WR, for example the main wind direction, and if necessary as a function of the associated wind speed WG.

Based on the geographical position 13 of the fertilizer spreader 1 and/or the wind sensor 7, which is continuously monitored in a known manner, at least one geographical position 14 of the spread fan SF1 or of partial areas of the spread fan SF1 can be determined using the direction of travel F. The geographical position 14 can, for example, relate in each case to a center of gravity of the fertilizer distribution in the spread fan SF1.

If the spread fan SF1 or its geographical position 14 is located in a certain partial area 8*a*, 8*b* of the agricultural area 8 and/or in the area of a geographical position 10 of a certain topographical feature 9, the wind coefficient 12 assigned there in each case flows into the calculation of the wind 6 and thus into the wind compensation described.

The applied wind coefficients 12 could be continuously updated with regard to the wind conditions, for example on the basis of wind measurements with the wind sensor 7 and/or a drone 15 flying over the agricultural area 8 and/or on the basis of externally collected weather data.

For example, a set of wind coefficients 12 could be assigned to each partial area 8*a*, 8*b* in the control system 5, from which the wind coefficient 12 that best matches the current wind direction WR and/or wind speed WG or current direction and/or speed of movement of the fertilizer spreader 1 is then selected and applied. This means that the topographical features 9 can have different effects on the wind direction WR and wind force WS of the wind 6 in the form of the wind coefficients 12, depending on the prevailing main wind conditions, which is assumed for the calculation of the wind compensation and is therefore the basis for this. However, other automatic calculation methods or selection methods are also conceivable.

It is also possible to monitor local changes in the wind direction WR and/or wind speed WG, for example with the wind sensor 7 when driving along a topographical feature 9 in a tramline and to assume similar local changes when driving along the same topographical feature 9 in an adjacent tramline. It is then assumed, for example, that a topographical feature 9 causes a more or less strong slipstream depending on the distance to the respective tramline. In addition, the relevant influence can be continuously estimated depending on the change in wind direction WR.

Figure 2E:
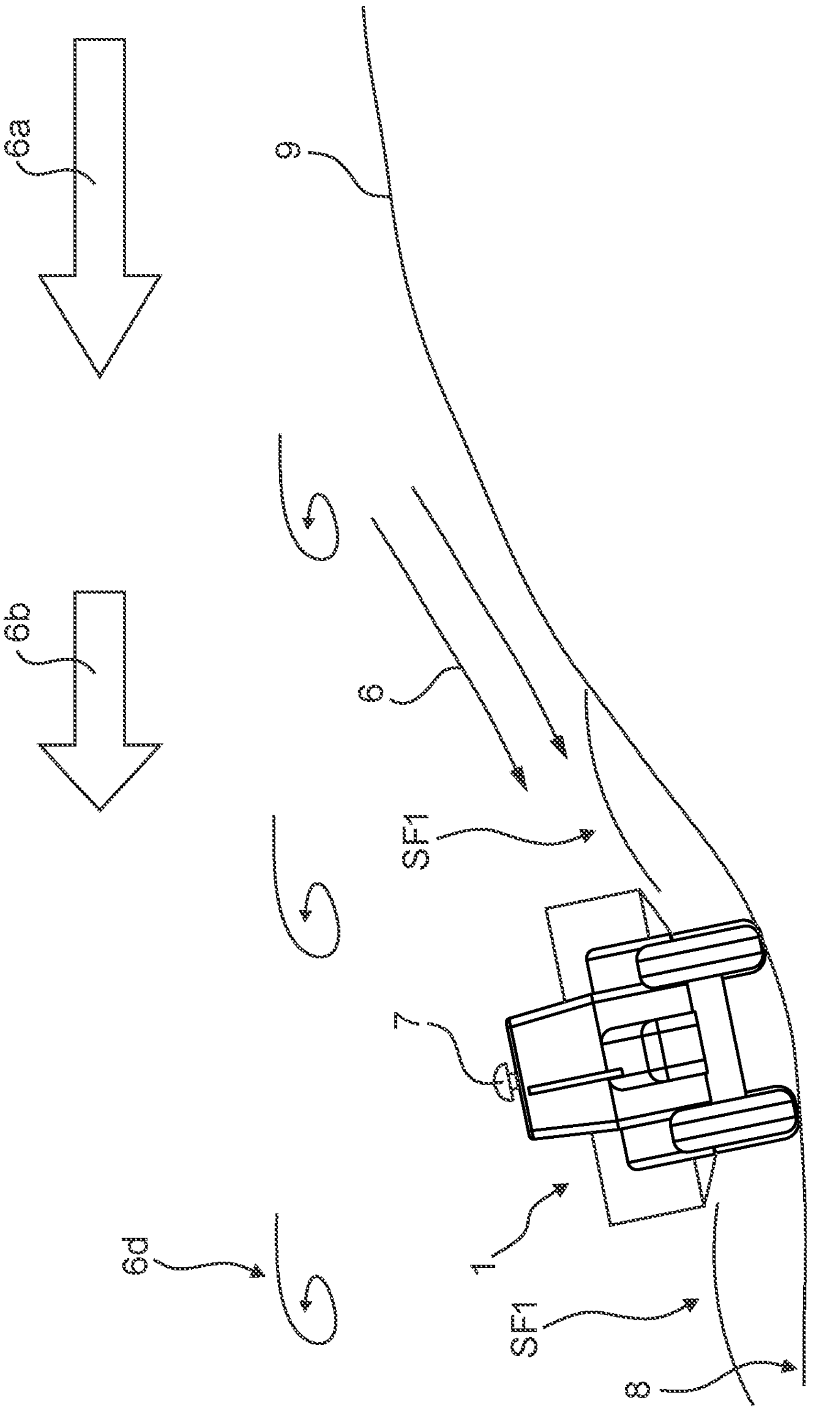

As FIG. 2E indicates in an exemplary and highly simplified manner, a topographical feature 9 could also have a flow-enhancing influence on the area of the spread fan SF1, if necessary also with respect to the wind conditions detected by the wind sensor 7. Accordingly, the topographical feature 9 could, for example, be a slope, a hill or a ridge with local wind amplification or the like.

The wind sensor 7 could then measure the relatively weak laminar flowing wind 6*b*, the relatively strong laminar flowing wind 6*a* (here a downdraft), the turbulent flowing wind 6*d* or a mixture thereof, depending on the relative position to the topographical feature 9. The wind 6 relevant for the area of the spread fan SF1 to be produced could differ from this and be corrected in knowledge of the relative geographical position of spread fan SF1 and topographical feature 9 to each other.

In addition, depending on the prevailing main wind direction, topographical features 9 can have different effects on the wind 6 that is decisive for the spread fan SF1, thus, for example, causing a slipstream 6*e*, turbulence or particularly strong wind currents.

Figure 3:
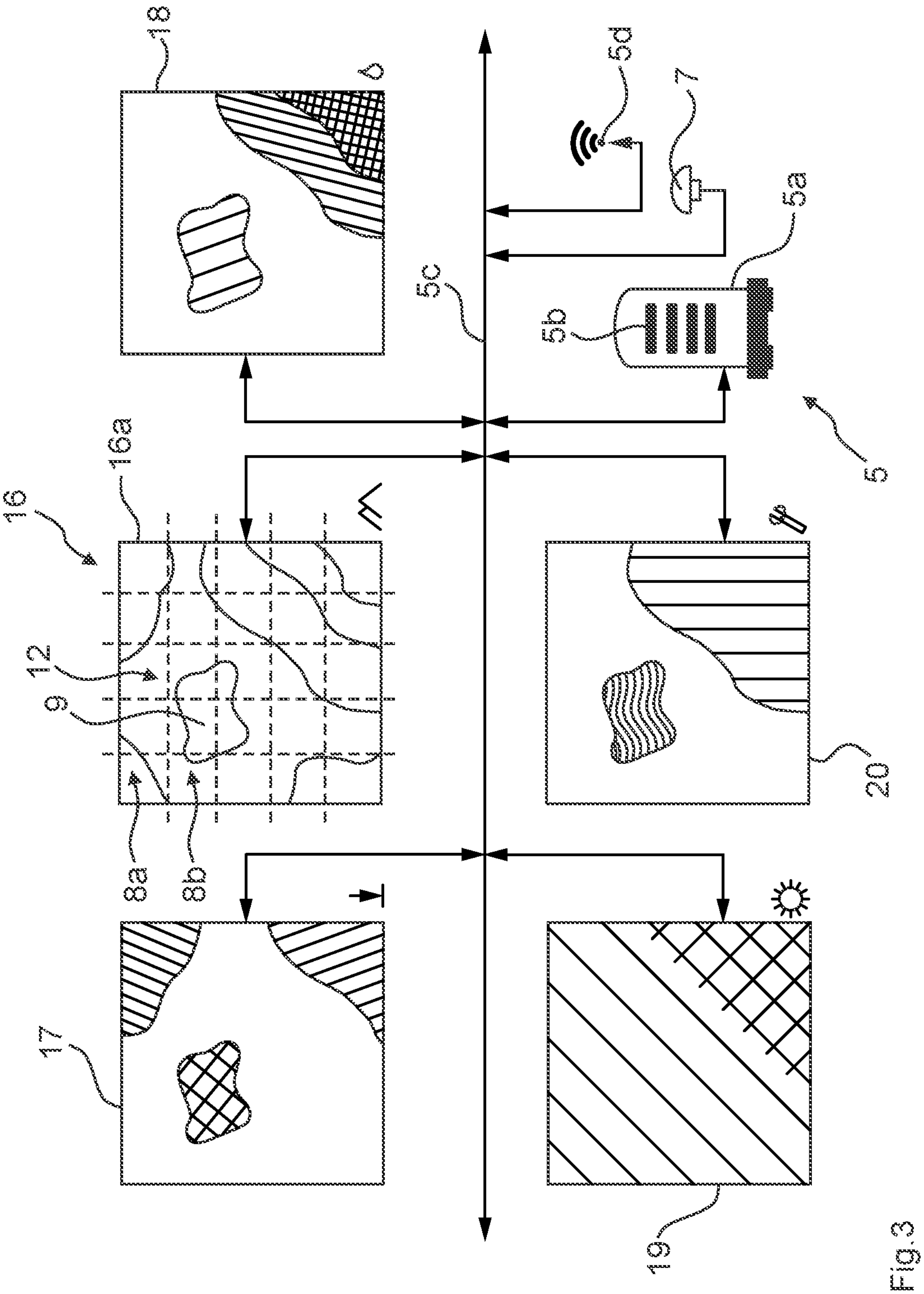
FIG. 3 is a schematic representation of a database with maps of the agricultural area.

FIG. 3 shows an example of how the wind coefficients 12 and/or other data characterizing the environmental conditions in the area of the agricultural area 8 can be managed and applied in the control system 5. For example, the wind coefficients 12 can be assigned to a wind map 16 superimposed on a topographic map 16*a* to assign the wind coefficients 12 to partial areas 8*a*, 8*b* of the agricultural area 8 and/or geographic positions 10 of the topographic features 9.

The control system 5 then comprises, for example, at least one computing unit 5*a*, a database 5*b*, a data bus 5*c* and a radio interface 5*d*, which enables communication with at least one drone 15 for accompanying wind measurement and/or with external systems, for example. Furthermore, at least one wind sensor 7 travelling on the fertilizer spreader 1 and/or on an associated tractor is connected to the data bus 5*b*.

Furthermore, additional maps or similar data formats relating to the agricultural area 8 to be worked can be connected to the data bus 5*c*. Associated in such a way are, for example, an application map 17 with location-specific desired spread rates and applied actual spread rates of fertilizer 2, a precipitation map 18 with historical and/or predicted local precipitation amounts, a solar radiation map 19 with historical and/or predicted local hours of sunshine, and a setting map 20 with location-specific setting parameters of fertilizer spreader 1.

When flying over the agricultural area 8, the drone 15 can measure the wind direction WR and the wind speed WG and transmit them to the control system 5. By means of such data, calculation models that determine the location-specific wind 6 depending on the topography and conventional wind maps can be validated and improved.

In addition, the drone 15 can fly over the agricultural area 8 before the fertilizer application. This makes it possible to determine whether fertilization with sufficient distribution quality is possible with the planned application, that is, with the fertilizer 2 to be discharged, the selected spreading disc 3 and the set settings under the currently measured wind conditions, for example by estimating the expected variation coefficients, or whether the application/discharge of the fertilizer 2 should be postponed at least in partial areas of the agricultural area 8.

In addition, settings adapted to the current wind 6 can be recommended on the basis of a drone flight and, if necessary, transmitted to the fertilizer spreader 1, for example to create larger areas with spreading overlaps in strong wind 6. The drone 15 can also fly directly ahead of the fertilizer spreader 1 in order to adapt its settings to the current wind data during the travel.

A swarm of two or more drones 15 could also be used, which spatially detect the wind 6 in a space around and/or immediately in front of the current spread pattern/spread fan SF1 and transmit this wind data to its control system 5 and in particular the computing unit 5*a* or similar job computer for more precise control of the fertilizer spreader 1.

With the database 5*b* and/or cartographic data from the topographical map 16, the application map 17, the precipitation map 18, the solar radiation map 19 and/or the settings map 20, extensive application evaluations, application forecasts and setting recommendations are possible.

For example, the recorded data during or after a spreading season can be displayed in the form of a wind diary, in which the wind data and possibly associated application data are summarized in daily and/or weekly reports. For example, it could indicate what proportion of a day's spreading time was uncritical in terms of wind conditions. If data from fertilizer 2 and setting data from fertilizer spreader 1 are also taken into account, the wind diary can be expanded into a spreading quality diary. For example, it could indicate what proportion of a day's spreading time was uncritical in terms of spreading quality.

The informative value of such diaries can be increased if the topographical features 9 in the area of the agricultural area 8 are taken into account and/or current data, such as wind/weather data and setting/application data, are supplemented with data from past and, in particular, corresponding application processes/applications.

Furthermore, wind conditions and spreading qualities for agricultural area 8 can be evaluated depending on the date/season, time of day and/or regional meteorological features.

As a result, the user is given the opportunity to optimize his spreading planning for a season or part of a season with the help of historical data of the type mentioned above. In this way, recommendations can be made as to which fertilizer 2 should be discharged when and to which area 8 in order to prevent and/or minimize wind-induced deterioration in the distribution quality. This also enables quality optimization over several agricultural areas 8 to be processed on average.

Such historical data may also show that a certain fertilizer 2 can be used more flexibly with regard to the discharge period and/or the distribution quality and/or leads to better results than other fertilizers. The result may be, for example, that a certain fertilizer 2 should preferably be spread at a certain time during certain seasonal periods, and/or that certain fertilizers 2 should be discharged earlier or later in the season.

The control system 5 thus also enables spreading weather forecasts and/or targeted operational planning for the agricultural area 8. Such forecasts on spreading quality can be used for different agricultural areas 8 and time periods to optimize a spreading season with regard to spreading quality in advance. For example, the respective crop type, fertilizer type and associated spreading parameters can be planned in this respect.

With the help of a regional wind forecast, a distribution quality at a certain working width AB1, for example, can be predicted for the agricultural area 8 and a certain period of time, taking into account the type and characteristic properties of the fertilizer 2. The forecast can be refined if, furthermore, setting values of the fertilizer spreader 1, the respective directions of travel F and/or the topography are taken into account in the manner described in connection with the disclosure.

Forecasts on temperature, solar radiation, precipitation and/or humidity can also be included in the planning, for example on the basis of the above-mentioned maps, as these environmental conditions have a substantial influence on the physical properties of certain fertilizers 2 and thus on the spreading results.

In order to refine conventional rough planning based on the main wind direction and main wind force with regard to planning and compensation of the wind 6, the topography of the agricultural area 8 is preferably taken into account, thus geographical positions 10 of relevant topographical features 9. Forecasts of temperature and solar radiation are possibly also helpful for this purpose, as is current weather data, which can include, for example, probabilities and forces of possible gusts of wind.

An evaluation of historical weather data, in particular precipitation, for agricultural area 8 can provide information on the uptake of the nutrients distributed by the soil during a seasonal spreading process. Losses can be estimated that occur if the given amount of nutrients could not be optimally absorbed by the soil due to the weather conditions prevailing during the spreading process. For example, it can be estimated to what extent the given nutrients have been converted into a usable form for the respective plants, which may depend on the amount of moisture available, for example. Such losses can be taken into account when planning a subsequent spreading process. Recorded weather data can also be used to determine how often such losses are to be expected. This can be taken into account when planning the additional quantities of nutrients required.

The susceptibility of spreading operations to wind influences depends on both the fertilizer 2 and the working width AB1 and/or casting distance WW1, WW2. In principle, large working widths AB1 and/or casting distances WW1, WW2 are more susceptible than small ones, and lighter fertilizer 2 is more susceptible than heavier fertilizer. When planning a spreading operation, weather forecasts can be used to determine whether it can be carried out with the required spreading quality under the expected ambient conditions. The control system 5 can display a relevant risk assessment to users, for example in the form of a traffic light on an on-board screen or a mobile device.

Other dependencies described above can also be taken into account in such a risk assessment. With the help of such assessments, an annual forecast can be prepared and the optimal seasonal period for a spreading process can be determined.

Figure 4:
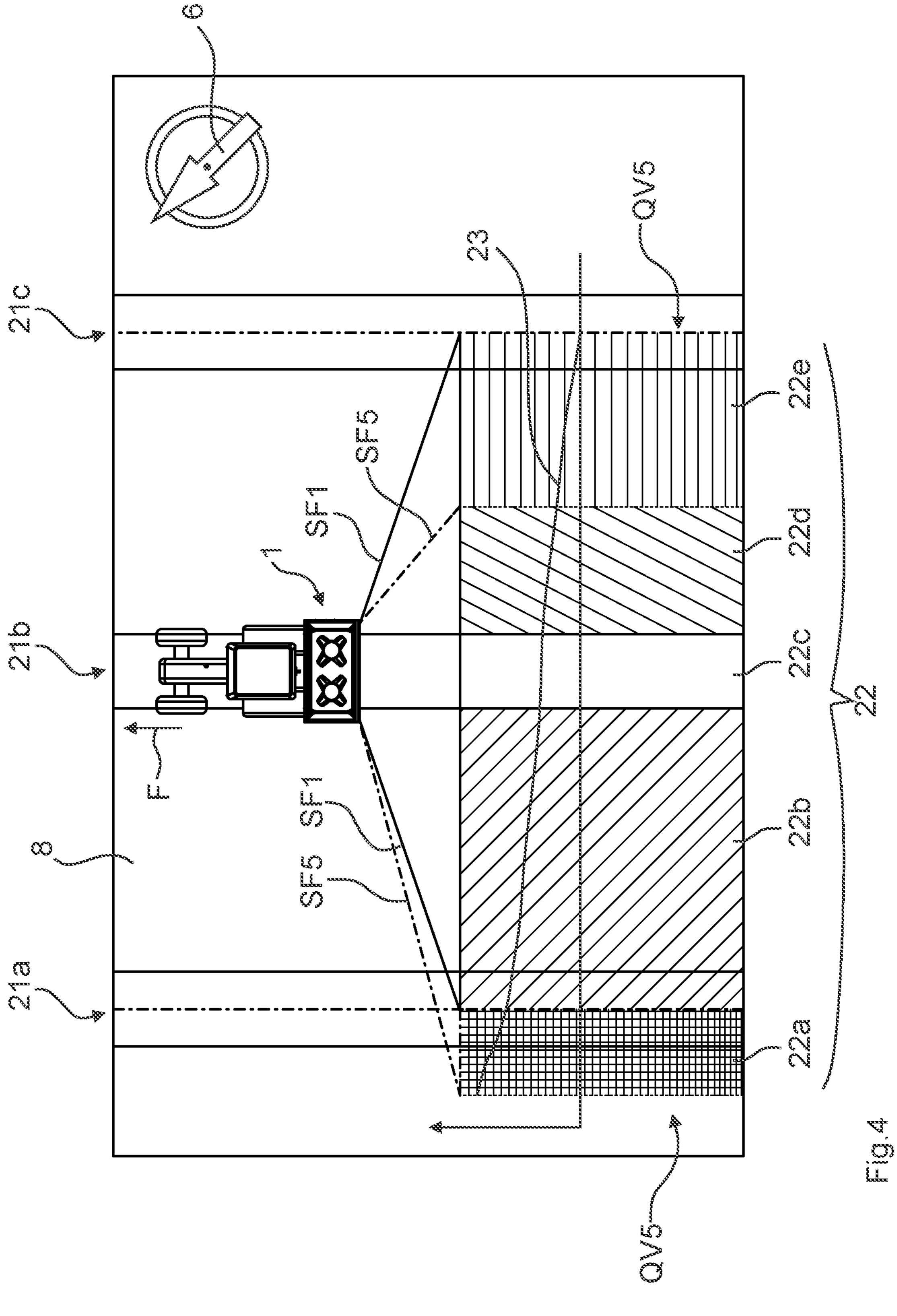
FIG. 4 is a schematic representation of a visualization of the distribution quality.

FIG. 4 illustrates a possible visualization of the distribution quality/spreading quality under the influence of wind, for example on an on-board screen of the fertilizer spreader 1/associated tractor or on a mobile terminal device based on the control system 5.

Three tramlines 21*a*, 21*b*, 21*c* are exemplarily shown, which are arranged equidistantly in the interior of the agricultural area 8 in a known manner. The intended first spread fan SF1 is shown schematically in the form of an axially symmetrical trapezoid with respect to the direction of travel F, a fifth spread fan SF5 distorted in the lateral direction S by the side component WS of the wind 6, on the other hand, is shown as a correspondingly asymmetrical trapezoid.

A displacement of the fifth spread fan SF5 towards the fertilizer spreader 1 caused by the travel direction component WF of the wind 6 can be neglected in the exemplary situation shown and is therefore not shown.

Accordingly, the ideal spread pattern/the ideal spread fan SF1 extends between the centers of the respective adjacent tramlines 21*a*, 21*c* when driving in the (here) middle tramline 21*b* in the idealized visualization of the spreading process.

In the example in FIG. 4, the left tramline 21*a* was worked during a previous travel with the ideal spread fan SF1. This may have taken place, for example, in ideal wind conditions or with the described wind compensation. When working along the central tramline 21*b*, the wind 6 blows with a predominant side component WS and, without wind compensation, results in a correspondingly distorted transverse distribution QV5 of the fertilizer 2. In this case, the spread fans SF1 (from preceding pass), SF5 (from current pass) overlap on the left side of the fertilizer spreader 1. The right tramline 21*c*, on the other hand, is still not worked.

The transverse distribution QV5 can be displayed clearly and thus quickly recognizable by the user by means of coloring and/or patterns of different spreading quantity classes 22. In the example, a distinction is made between the classes "considerably too much" 22*a*, "too much" 22*b*, "on target" 22*c*, "too little" 22*d* and "considerably too little" 22*d*. The classification and visualization can thereby automatically take into account whether an adjacent tramline 21*a*, 21*c* has already been travelled on or not. In principle, however, any classifications for visualization are conceivable, if necessary also on the basis of simulated/virtual travels, here for example along tramline 21*c*. A classification "on target" is preferably only specified for those areas for which a connecting travel has already taken place, as set/actual quantities usually result from the superimposition of connecting spreading patterns.

If the wind conditions were constant when successively traveling on adjacent tramlines 21*a*, 21*b*, 21*c*, there would ideally always be an identical wind-related transverse distortion of the ideal spread fan SF1 (viewed in cardinal directions) despite the changing direction of travel F. The asymmetry of the fifth transverse distribution QV5 would then gradually even out. This means that areas that are too lightly spread when traveling on one tramline 21*b* would be spread too heavily when traveling on the other tramline 21*c*. In practice, however, the displacement caused by the wind 6 is usually not linear, which results in a certain asymmetrical spreading pattern deformation with the consequence of local over- and under-fertilization.

For visualization of the distortion of spread fans SF1 to SF5 by the wind 6 as well as the compensatory adaption or wind compensation, simplified geometric representations of the current spread fans SF1 to SF5 and/or transverse distributions QV1 to QV5 of the fertilizer spreader 1 and/or the individual spreading discs 3 can be used, for example trapezoids or similar polygons.

Conventional visualizations of wind direction, for example as a simplified wind rose, and wind force, for example as a bar chart, with colour gradation, for example in the sense of a traffic light, are also conceivable, depending on whether and how often the wind compensation reaches the control limits of the control system 5 or would theoretically have to be controlled/compensated beyond them.

In addition, a transverse distribution resulting from outward and return travel along adjacent tramlines 21*a*, 21*b*, 21*c* can be displayed as a diagram 23, which ideally (in relation to a homogeneous desired distribution) results in a horizontal line. In addition, representations commonly used in sowing technology would be conceivable in principle, for example bar charts based on partial widths TB or color scales (not shown) and/or real-time representations of transverse distributions QV1 to QV5 or the like.

The compensatory counteraction of the control system 5 during activity could also be symbolically represented, for example by arrows. If the disruptive wind influences cannot be regulated/compensated by the control system 5, this can be highlighted in color on an application map 17.

Colored visualizations are particularly suitable for over-fertilization and under-fertilization, wherein affected partial areas/partial widths of the agricultural area 8 can then be marked in color accordingly. For example, the respective area can be uncolored before the spreading process and turn yellow during the first pass. The area then turns green when the subsequent pass is successful or whenever the desired quantity is reached. Incorrect applications can be displayed in color.

The user can then visually comprehend how spread fans SF1 to SF5 are deformed (distorted and/or displaced) by the wind 6, and to what extent this deformation is compensated for by the control system 5. This makes it possible to recognize how effective the wind compensation is in a particular situation. For example, visualizations of actual, desired and compensation, i.e. the possible or actual effect of wind compensation, are possible. The underlying data can also be stored in the database 5*b* for later use.

Figure 5A:
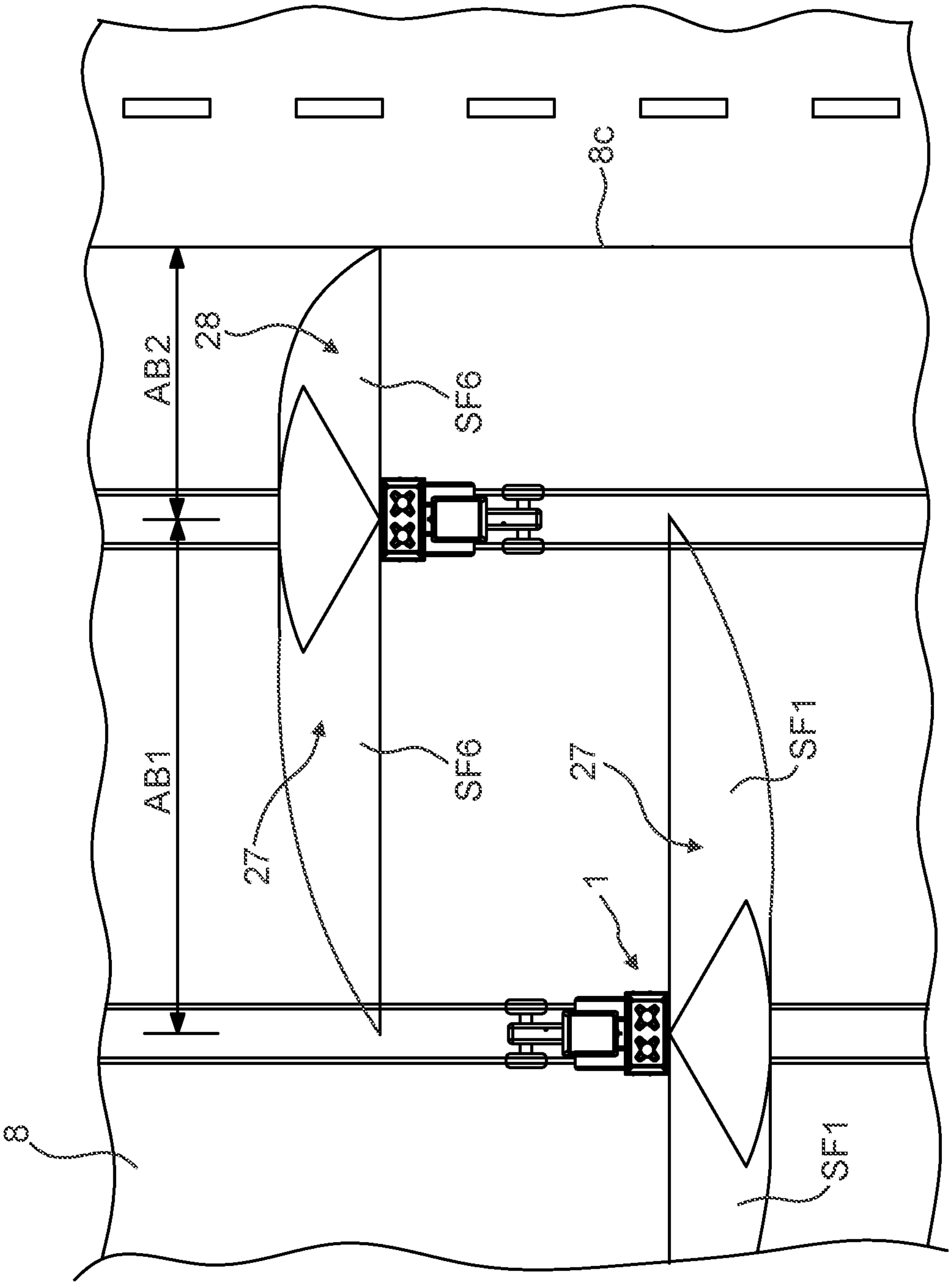
FIGS. 5A and 5B are schematic representations of situations during boundary spreading.
Figure 5B:
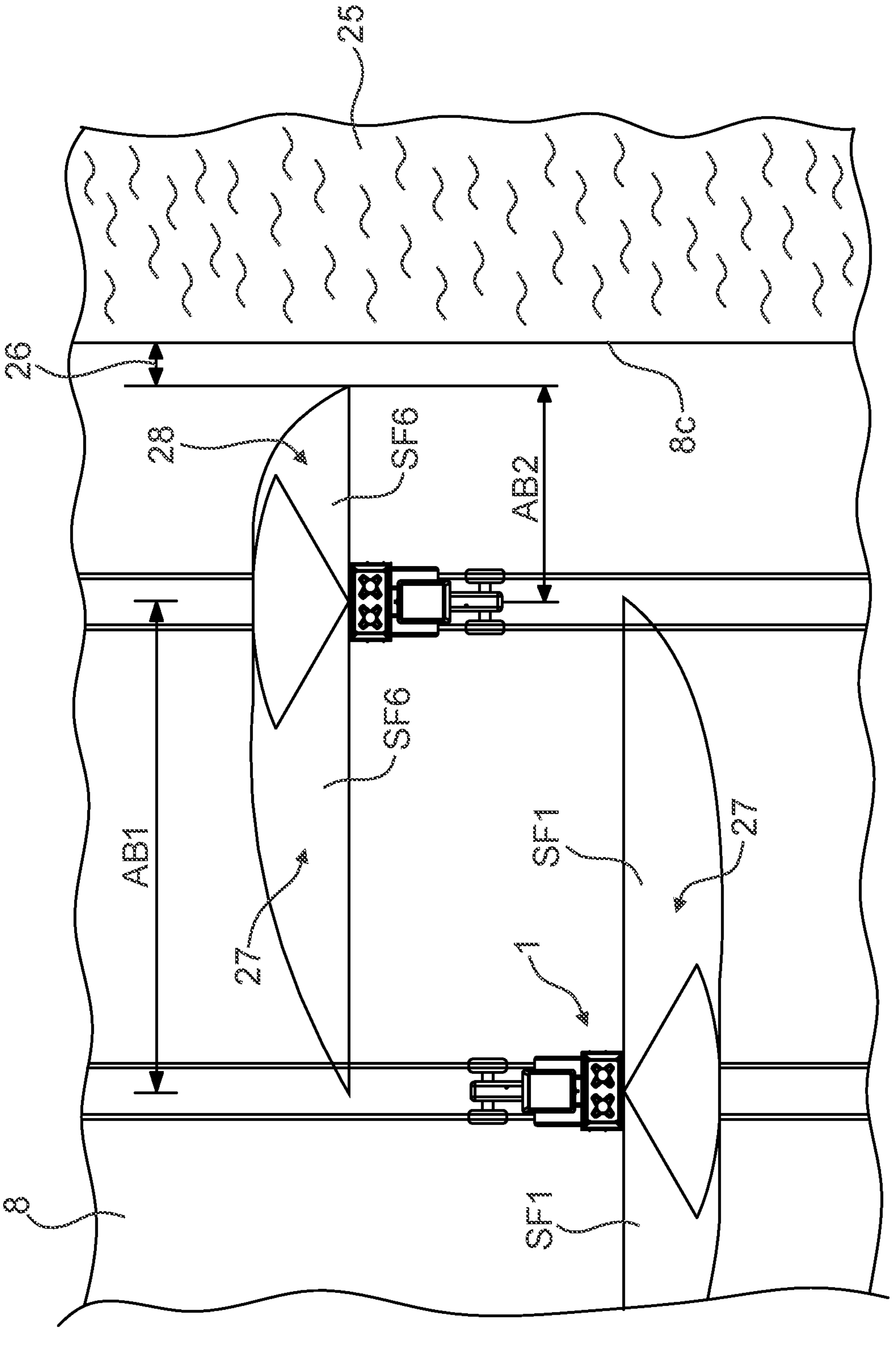

FIGS. 5A and 5B illustrate the influence of wind during boundary spreading, thus a situation in which the spreading disc 3 facing the inside of the agricultural area 8 is operated with the settings for normal working width AB1, the spreading disc 3 arranged on the side of the boundary 8*c* of the agricultural area 8 with settings for a comparatively reduced working width AB2 (generated on one side only).

For boundary spreading, a correspondingly asymmetrical sixth spread fan SF6 is used in the sense of a desired spread pattern, even in calm conditions, while the first spread fan SF1, which is axially symmetrical with respect to the direction of travel F, is used in the interior.

For this purpose, the spread fan SF6 can be fundamentally changed, for example by first setting the spreading discs 3, casting vanes 3*a* and/or an assigned boundary spreading deflector (not shown).

In conjunction with wind compensation activated on both sides by the control system 5, the inertia of the compensation control on the boundary side can lead to the fertilizer 2 being temporarily cast beyond the boundary in the event of strongly fluctuating wind force and/or wind direction. This can happen, for example, if the wind initially blows strongly from the boundary and the control system 5 therefore compensatorily increases the rotational speed DZ2 and thus the casting energy. If the wind 6 then suddenly changes direction, the control system 5 may not be able to reduce the rotational speed DZ2 quickly enough due to the mass inertia of the spreading disk 3 and/or the inertia of the control system.

This can be counteracted by the control system 5 receiving information on the current wind conditions in the area of the boundary 8*c* from at least one drone 15 that is flying ahead and/or upwind in particular. This means that the wind conditions occurring along the boundary 8*c*, in particular directly in front of the current spread fan SF6, are recorded and the wind compensation is carried out in advance on this basis. In this way, even short-term wind changes can be taken into account in a timely manner.

Alternatively or additionally, the wind compensation can be deactivated by the control system 5 during boundary spreading on both sides or only on the boundary side. If this is done automatically, a warning message can be issued to the effect that the wind compensation is deactivated and the wind sensitivity of the fertilizer spreader 1 or the fertilizer discharge has increased as a result. The control system 5 could also issue such a warning message depending on the force and/or variability of the wind 6 and only when the quality of the spread pattern/spread fan SF6 is likely to deteriorate in a relevant manner.

Depending on the force and/or variability of the wind 6, however, the control system 5 could also be further operated with attenuated compensation, for example an increase in the rotational speeds DZ1, DZ1 specifically attenuated by a certain percentage compared to compensation in stable wind conditions. Compensation attenuation could be triggered automatically.

In the case of strongly fluctuating wind conditions, the inertia of the compensation control can be increased so that relevant short-term wind influences are averaged out or these wind influences do not lead to an undesirably strong reaction (overshoot) of the compensation control. For example, an excessively strong compensatory reaction of the control system 5 to a short gust of wind could be more damaging to the spread pattern/spread fan SF6 than accepting an uncompensated wind influence.

This is particularly true for field boundaries. Here, the reaction is additionally dependent on the main wind direction, thus whether the wind 6 is blowing from the boundary 8*c* or towards it. The control inertia should then be adapted to the main wind direction as far as possible.

If, for example, the wind blows from the boundary 8*c*, the control inertia can be comparatively high, as the fertilizer 2 is then not compensatorily cast further towards the boundary and a poorer quality spread fan SF6 can only occur on the inside of the field. Due to legal requirements, optimization is then always carried out in favor of the boundary situation, thus on the boundary side, since incorrect discharges on the inside of the field are more acceptable and can still be compensated for subsequently, if necessary.

If, on the other hand, the wind blows towards the boundary 8*c*, the control system 5 must react more quickly in order to reliably prevent the fertilizer 2 from being cast beyond the boundary 8*c*. A possible deterioration of the spread fan SF6 on the inside of the field must be accepted. However, this can be counteracted by controlling the spreading disks 3 and associated feed systems with different inertia depending on the boundary situation and main wind direction. The control inertia can be set differently for the spreading disks 3, depending on whether they are facing towards or away from the boundary 8*c*. For example, the control can react more quickly when the wind increases towards the boundary 8*c* and adapt more slowly when the wind decreases.

A further possibility to reduce the risk of casting beyond the field boundary is to increase the desired distance 26 to the boundary depending on the force and/or variability of the wind 6. For this purpose, the spread fan SF6 is fundamentally changed, for example by first adapting the setting of the spread fans 3, casting vanes 3*a* and/or an associated boundary spreading deflector (not shown) depending on the wind conditions. This can also be done automatically. This specification can then be modified by the control system 5 in addition to further wind compensation.

As FIGS. 5A and 5B exemplarily indicate, the above differentiation according to the main wind direction can also depend on the type of surface located beyond the boundary 8*c*. For example, if it is a road 24, the boundary situation is less critical than with an adjacent body of water 25. In critical boundary situations, a desired distance 26 between the spread fan SF6 and the boundary 8*c* is preferably specified.

In the cases described, the dosing quantities DM1, DM2 of the fertilizer 2 on the spreading discs 3 are then adapted as required. This allows different discharge rates 27, 28 (per unit area) to be set on the inside of the field (higher) and the boundary side (lower) of the spread fan SF6.

Figure 6:
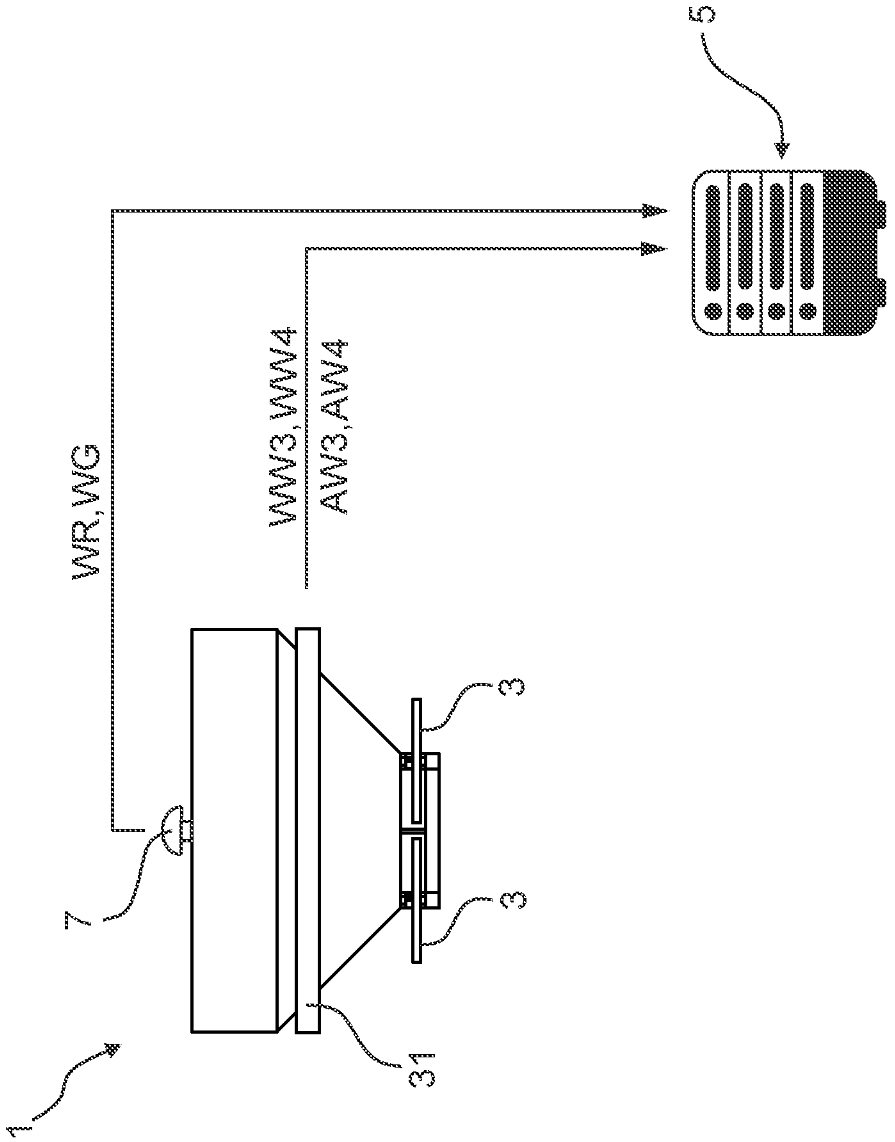
FIG. 6 is a schematic representation of a variant with a monitoring system for generated spread fans.

FIG. 6 schematically shows a variant of the fertilizer spreader 1 in which the actual ejection angles AW3, AW4 (schematically indicated in FIG. 1A) and the actual casting distances WW3, WW4 (schematically indicated in FIG. 1B) for the spreading discs 3 are each continuously measured by a monitoring system 31, for example by means of radar radiation, in a manner known in principle.

The control system 5 compares the actual ejection angles AW3, AW4 of the fertilizer 2 determined as such with the desired ejection angles AW1, AW2, which are adapted for compensation, if necessary. Depending on the deviation determined, the setting parameters of the fertilizer spreader 1 are changed such that the actual ejection angles AW3, AW4 are as close as possible to the desired ejection angles AW1, AW2. By measuring the wind direction WR and wind speed WG of the wind 6 and, in particular, subsequent vectorial decomposition into the side component WS and the travel direction component WF and/or consideration of the flow influence of topographical features 9 of the agricultural area 8, the influence of the prevailing wind 6 in each case on the discharged fertilizer 2 can be determined and taken into account.

The same applies to an optional adaption of the actual casting distances WW3, WW4 to the desired casting distances WW1, WW2. The monitoring system 31 measures the actual casting distances WW3, WW4, for example, by means of the casting speed of the fertilizer 2. However, this measurement is only made in one direction, and the wind influence on this measurement cannot be quantified exactly. Thus, the actual casting distances WW3, WW4 are still converted to the real wind situation by a calculation component.

In order to counteract the disturbing influence of the wind 6 in a compensatory manner, the desired ejection angles AW1, AW2 and/or desired casting distances WW1, WW2 are then suitably adapted depending on the vectorially decomposed and/or topographically corrected wind 6, as already described in principle above.

Depending on the application situation and the requirement for compensation of wind situations, a plurality of desired ejection angles AW1, AW2 and/or desired casting distances WW1, WW2 can be provided in the control system 5 in the form of electronic selection tables or the like.

Alternatively, the influences of the wind (in the form of tables, functions or similar) on the spread fan can be stored, which can then be used to calculate the changes. The necessary corrections to the setting values can then be calculated on the basis of the change and other tables, functions or similar. This allows a plurality of dependencies between setting parameters and ejection parameters to be displayed and taken into account during spreading depending on the situation.

This can be preferred in particular if a monitoring system 31 for measuring the actual ejection angles AW3, AW4 and/or actual casting distances WW3, WW4 of the fertilizer 2 is not present. If, for example, only the wind sensor 7 is present, electronic selection tables or the like means for displaying the above dependencies can be preferably integrated into a wind compensation system as described above.

FIG. 7 illustrates the disruptive influence of, for example, wind 6 coming at an angle from the front on a part-width section control of the fertilizer spreader 1. Accordingly, the individual partial widths TB of a spread fan SF1 generated in calm conditions are shifted backwards on the side facing the wind 6 against the direction of travel F and also offset towards each other in the lateral direction S. The transverse distribution of the partial widths TB is thus compressed there. On the side facing away from the wind 6, the partial widths TB are also shifted backwards, but offset from each other in the lateral direction S. The transverse distribution of the partial widths TB is thus widened there.

This results in a seventh spread fan SF7 with an excessive overlap of adjacent partial widths TB on the windward side. On the other side of the seventh spread fan SF7 (only indicated by the partial widths TB) there are enlarged gaps in between. These gaps or overlaps only visualize the under- or over-fertilization in a simplified manner, as spread fans do not have sharp boundaries in practice. Accordingly, such areas are then spread too much or too little (but not at all). However, these “gaps” can cause problems with visualization and processing on the spreading devices.

Due to the wind-related deviation ΔWW of the actual casting distances WW3, WW4 from their desired casting distances WW1, WW2, the (uncompensated) actual positions Pi (in the seventh spread fan SF7) of all partial widths TB in the direction of travel F also deviate from their desired positions PS (in the first spread fan SF1). The partial widths TB are then not switched to match the application specification without wind compensation, in the example prematurely. This means that the partial widths TB arrive at a certain location later than assumed by the control system 5.

Compensation of the wind-related deviation ΔWW of the actual casting distances WW3, WW4 is usually the main focus of part-width section control. Nevertheless, depending on the wind direction and wind force as well as the degree of overlap of the partial widths TB in the first spread fan SF1 (desired spread pattern), it may make sense to correct an excessively compressed or widened transverse distribution of the partial widths TB to be switched. A targeted overlapping of the partial widths TB is also known to be desired for the first spread fan SF1, for example, in order to avoid uncultivated stripes during cornering and/or under the influence of wind in the visualization and processing on the control units.

This means that wind compensation can be carried out as described in principle with regard to FIGS. 1B and 1C, thus that a spreading pattern correction (compensation of the lateral spreading pattern displacement) is carried out exclusively or primarily in the lateral direction and a switching point correction (compensation of the spreading pattern displacement in/against the direction of travel) exclusively or primarily in the direction of travel.

The partial widths TB are preferably created in the control system 5 of the fertilizer spreader 1 such that their distribution in the lateral direction S and, if possible, also in the direction of travel F reflects the arc shape of the spread fan SF1 or the respective desired spread fan. Switching points can then be calculated and assigned with particular precision.

In addition, the partial widths TB have a length extension 32 in the direction of travel F such that adjacent partial widths TB overlap in the lateral direction S in the direction of travel F. This makes it possible to avoid gaps in the visualization of the processing on the control computers even when the spread fan/partial widths TB swivel out when cornering. This is also shown schematically in FIG. 7.

Wind-related actual positions of partial widths TB can be measured, calculated and/or displayed as a deviation from their desired positions, for example. This allows users to estimate positions, expansions and quantity distributions and/or switching points of spread fans in a clear form.

The calculation of the switching points (corresponding to the wind-related actual positions of the partial widths) can play an important role, for example, when changing between the inside of the field and the headland, as well as in boundary situations and/or when working on wedge-shaped areas.

If the wind 6 is too strong, the control system 5 with the actuators controlled by it may no longer be able to provide the wind compensation to the extent actually required. The user can then use a simplified/clear visualization of the resulting spread fan SF1 to SF7 to get an idea of the associated transverse distribution and, if necessary, decide whether an ongoing spreading process must be interrupted or not.

If the wind is too strong 6 and discharge continues, the insufficiently wind-compensated spread fans SF1 to SF7 can be georeferenced based on the setting parameters used and the measured/considered wind influence to enable targeted compensation of the incorrect fertilizer discharge at a later time.

If the application requirements, for example the nature of the fertilizer 2, allow for subsequent compensation, rather under-fertilization than over-fertilization is to be attempted in the event of insufficient wind compensation, as missing fertilizer can in principle still be supplemented. Over-fertilization, on the other hand, cannot be reversed and may be irreversibly damaging.

If disruptive wind conditions cannot be sufficiently compensated for, it is conceivable to operate the fertilizer spreader 1 in a "wind emergency mode" with a reduced discharge rate as a precaution. In this way, basic fertilization can be ensured and potentially harmful over-fertilization can be largely avoided.

If the wind 6 is consistently so strong that a tramline-symmetrical spread fan SF1 cannot be produced, its (then essentially constant over time) distortion and/or displacement can also be accepted, if necessary. The parallel tramlines 21*a*, 21*b*, 21*c* can then be spread with the distorted/displaced spread fan SF2 to SF4, wherein both lateral flanks should fall in a similar manner, as they are arranged in mirror image for the respective travel and associated subsequent travel. Taking into account the wind-related asymmetry of the respective spread fan SF4, a relatively even overlap can also be achieved in this way. This case can be taken into account in the control by means of a special mode, so that the correction of the control parameters aims to generate a spread fan that is shifted towards the tramlines by the wind, but which complements the overlapping of the evenly shifted spread fans to achieve a good transverse distribution.

An adaption/compensation with regard to the width and shape of the spread fan SF2 to SF4 as well as with regard to the discharge rate 27, 28 is then required in particular for the tramline that is traveled first and last. However, the compensation required in each case can also be offset against a wind-related increased safety zone, thus the desired distance 26 to the boundary 8*c*.

The invention claimed is:

1. A method for electronic wind compensation of a fertilizer spreader which discharges fertilizer onto an agricultural area by rotating spreading discs, wherein the positions of feed surfaces for the fertilizer on the spreading discs are set as a function of desired ejection angles, which are compensatorily adapted for the spreading discs individually on the basis of a wind prevailing during discharge, in order to counteract a deviation of an actual transverse distribution of the fertilizer from a desired transverse distribution caused by the wind, wherein rotational speeds of the spreading discs are compensatorily adapted in order to counteract a deviation of an actual casting distance of the fertilizer from a desired casting distance caused by the wind, wherein a database and/or at least one function for characterizing a plurality of different discharge situations and/or wind conditions and/or spread patterns is provided and actual ejection angles and actual casting distances are calculated on the basis of the respectively set spread pattern and the measured/estimated wind.

2. The method according to claim 1, wherein the wind direction and the wind speed of the wind are vectorially decomposed into a travel direction component parallel to the travel direction and a side component orthogonal to the travel direction in order to adapt the desired ejection angles and/or to reduce the deviation of the actual casting distance.

3. The method according to claim 1, wherein the wind direction and the wind speed of the wind are used to determine a displacement of the spread fan generated with the spreading discs under the influence of wind compared to a spread fan generated without the influence of wind, and wherein at least one side component of the displacement orthogonal to the direction of travel is calculated to reduce the deviation of the actual casting distance and/or an adaptation of the desired ejection angles is calculated on the basis of the displacement as a whole.

4. The method according to claim 2, wherein the deviation of the actual casting distance is compensatorily reduced on the basis of the side component with its predominant weighting with respect to an associated travel direction component.

5. The method according to claim 3, wherein the desired ejection angles are compensatorily adapted on the basis of actual ejection angles assigned to the displacement taking into account the compensation of the actual casting distance.

6. The method according to claim 1, wherein spread fans and/or transverse distributions generated by the spreading discs are corrected and equalized by compensatory reduction of the deviation of the actual casting distance from its standard value for calm conditions.

7. The method according to claim 1, wherein spread fans and/or transverse distributions generated by the spreading discs are corrected and equalized by compensatory change of the desired ejection angles with respect to their standard values for calm conditions.

8. The method according to claim 1, wherein a wind-altering and wind-attenuating influence of at least one topographical feature present on the agricultural area is quantified by measurement and/or calculation and is included in a calculation of the wind prevailing in the area at a geographical position of a spread fan generated by the spreading discs for its compensation starting from a wind measured in the area of the agricultural area during discharge.

9. The method according to claim 5, wherein wind coefficients are assigned to the topographical feature and/or a partial area of the agricultural area assigned thereto, which wind coefficients quantify the wind-changing influence of the topographical feature as a function of different wind directions.

10. The method according to claim 1, wherein wind direction and wind speed are measured during discharge in the area of the fertilizer spreader and stored with associated geographical measurement positions, and wherein the geographical position of at least one topographical feature of the agricultural area and a prevailing main wind direction and main wind force are assigned to the measured wind direction and wind speed in order to quantify a wind-changing influence of the topographical feature in a location-specific manner with regard to main wind directions and main wind forces.

11. The method according to claim 1, wherein wind directions and wind speeds measured at different heights, by a wind sensor travelling with the fertilizer spreader and a drone flying over the agricultural area, are compared mechanically in order to qualitatively estimate the wind prevailing in the area of the fertilizer spreader with regard to the prevailing of uniform, turbulent or gusty wind conditions.

12. The method according to claim 1, wherein wind directions and wind speeds measured by a wind sensor travelling with the fertilizer spreader and/or at least one drone flying over the agricultural area are stored in the form of a wind map and are superimposed on a topographical map of the agricultural area.

13. The method according to claim 9, wherein the wind map is mechanically compared with an application map with location-specific desired spread rates and applied actual spread rates of the fertilizer, a precipitation map with historical and/or predicted local precipitation amounts, a solar radiation map with historical and/or predicted local sunshine hours, and/or a setting map with location-specific setting values of the fertilizer spreader in order to plan future travels for discharging the fertilizer on the agricultural area on the basis of historical data of past travels of corresponding discharging operations.

14. The method according to claim 1, wherein the wind direction and wind speed as well as associated geographical measurement positions are measured by at least one drone flying over the agricultural area and flying ahead of the fertilizer spreader.

15. The method according to claim 1, wherein the spreading discs and associated feed systems are controlled with different inertia and/or amplitude during boundary spreading depending on the wind direction with respect to the travelled boundary relatively fast/with greater amplitude when the wind blows from the fertilizer spreader towards the boundary and relatively slow/with smaller amplitude when the wind blows from the boundary towards the fertilizer spreader.

16. The method according to claim 1, wherein, during boundary spreading, setting values of the spreading discs, casting vanes present thereon and/or an associated boundary spreading deflector and additionally a desired distance to the boundary which has been traveled are adapted in each case as a function of the wind direction and wind speed.

17. The method according to claim 1, wherein, on the basis of calculated or measured actual ejection angles and the actual casting distances, the shape and/or position of spread fans and/or transverse distributions of the fertilizer are calculated for the wind direction and wind speed used as a basis in the area of the spread fans, and associated compensatory changes are displayed in the form of polygons.

18. The method according to claim 1, wherein over-fertilization and under-fertilization are visualized cartographically by color scaling of affected partial areas and/or partial widths of the agricultural area, wherein different color scaling is used for areas before the spreading operation, after the first pass, and after the subsequent pass.

19. The method according to claim 1, wherein deviations of wind-related actual positions of individual part-widths from their desired positions are measured, calculated and/or displayed and/or the actual positions are compensatorily adapted during part-width section control.

20. A control system for a fertilizer spreader with a computing unit and at least one program stored therein for compensatory control of the spreading discs of the fertilizer spreader together with associated feed systems according to the method according to claim 1.

21. A fertilizer spreader for discharging fertilizer using two spreading discs, with the control system according to claim 20.

* * * * *